US008442268B2

(12) United States Patent
Isogai et al.

(10) Patent No.: US 8,442,268 B2
(45) Date of Patent: May 14, 2013

(54) VIDEO ANALYSIS APPARATUS AND METHOD FOR CALCULATING INTERPERSONAL RELATIONSHIP EVALUATION VALUE USING VIDEO ANALYSIS

(75) Inventors: Kuniaki Isogai, Osaka (JP); Takashi Kawamura, Kyoto (JP); Akihiro Kawabata, Kanagawa (JP)

(73) Assignee: Panasonic Corporation, Osaka (JP)

( * ) Notice: Subject to any disclaimer, the term of this patent is extended or adjusted under 35 U.S.C. 154(b) by 662 days.

(21) Appl. No.: 12/671,101

(22) PCT Filed: Jul. 30, 2008

(86) PCT No.: PCT/JP2008/002040
§ 371 (c)(1),
(2), (4) Date: Jan. 28, 2010

(87) PCT Pub. No.: WO2009/016833
PCT Pub. Date: Feb. 5, 2009

(65) Prior Publication Data
US 2010/0195874 A1 Aug. 5, 2010

(30) Foreign Application Priority Data
Jul. 31, 2007 (JP) ................................. 2007-198982

(51) Int. Cl.
*G06K 9/00* (2006.01)
(52) U.S. Cl.
USPC .......................................................... 382/103

(58) Field of Classification Search ....................... None
See application file for complete search history.

(56) References Cited

U.S. PATENT DOCUMENTS

| 7,783,115 B2* | 8/2010 | Matsui et al. ................. 382/227 |
| 7,916,894 B1* | 3/2011 | Dhillon et al. ................. 382/103 |
| 2007/0171296 A1* | 7/2007 | Tsukiji et al. ................. 348/345 |
| 2008/0310688 A1* | 12/2008 | Goldberg ....................... 382/118 |

FOREIGN PATENT DOCUMENTS

| JP | 2006-81021 | 3/2006 |
| JP | 2006-236216 | 9/2006 |
| JP | 2007-36540 | 2/2007 |

OTHER PUBLICATIONS

International Search Report issued Sep. 2, 2008 in International (PCT) Application No. PCT/JP2008/002040.

(Continued)

*Primary Examiner* — Claire X Wang
(74) *Attorney, Agent, or Firm* — Wenderoth, Lind & Ponack, L.L.P.

(57) ABSTRACT

An image analysis apparatus comprising: an identification unit operable to, in each of a plurality of scenes, identify one or more persons who appear in the scene; a scene evaluation value calculation unit operable to calculate a scene evaluation value for, among the plurality of scenes, each scene in which at least one person has been identified, the one person being included as one of persons identified by the identification unit; a scene selection unit operable to select, from among the plurality of scenes, one or more scenes that include the one person; and a person evaluation value calculation unit operable to calculate a person evaluation value for the one person by summating scene evaluation values of the scenes selected by the scene selection unit.

18 Claims, 27 Drawing Sheets

OTHER PUBLICATIONS

Blum, M. et al., Capture, Archival, and Retrieval of Personal Experience, InSense: Interest-Based Life Logging, *IEEE Computer Society*, vol. 13, No. 4 (Dec. 2006), pp. 40-48.

Koseki, Y. et al., System of Summarization and Edit Experiences by Using Animated Cartoon, *Japan Society for Software Science and Technology*, vol. 23, No. 3 (Jul. 26, 2007), pp. 41-50 (including English abstract).

Morita, T. et al., A Method for Mining Patterns from Multimodal Interaction Log, *Information Processing Society of Japan*, vol. 47, No. 1 (Jan. 15, 2006), pp. 121-130 (including English abstract).

Ueda, T. et al., Digest Creation of Video Data recorded by Wearable Cameras using Locational and Geographical Information, *IEICE Technical Report*, vol. 101, No. 193 (Jul. 12, 2001), pp. 175-182 (including English abstract).

* cited by examiner

Data recording apparatus 1

FIG. 6
Profile information for recognition stored in audio/face information storage unit 312
| Person ID | Face image | Audio information |
|---|---|---|
| A |  | Audio 0 |
| B |  | Audio 1 |
| C |  | Audio 2 |
| ⋮ | ⋮ | ⋮ |
FIG. 7
Reference place information
| Name | Latitude | Longitude |
|---|---|---|
| Home | N34° 35′ 00 | W135° 20′ 30 |
| Office | N34° 37′ 30 | W135° 20′ 30 |

FIG. 9

Scene time information

| Scene ID | Time information |
|---|---|
| 1 | 9:00~10:00 |
| 2 | 10:00~15:00 |
| 3 | 15:00~18:00 |
| 4 | 18:00~19:00 |

FIG. 10

Scene participant information

| Scene ID | Participant ID |
|---|---|
| 1 | - |
| 2 | A, B |
| 3 | A, C, D |
| 4 | C |

FIG. 11

Scene place information

| Scene ID | Latitude | Longitude | Landmark information |
|---|---|---|---|
| 1 | N34° 35' 00 | W135° 20' 30 | Home |
| 2 | N34° 37' 30 | W135° 20' 30 | Office |
| 3 | N34° 38' 00 | W135° 13' 30 | Amusement park |
| 4 | N34° 37' 00 | W135° 17' 00 | Downtown |

FIG. 12

Scene photographer information

| Scene ID | Photographer ID |
|---|---|
| 1 | X |
| 2 | X |
| 3 | X |
| 4 | X |

FIG. 13

| Scene ID | Time information | Time length | Time weight value |
|---|---|---|---|
| 2 | 10:00~15:00 | 5:00 | 1.0 |
| 3 | 15:00~18:00 | 3:00 | 0.6 |
| 4 | 18:00~19:00 | 1:00 | 0.2 |

FIG. 14

| Scene ID | Number of participants | Number-of-participant weight value |
|---|---|---|
| 2 | 3 | 0.66 |
| 3 | 4 | 0.5 |
| 4 | 2 | 1.0 |

FIG. 15

| Scene ID | Landmark information | Distance from reference | Place weight value |
|---|---|---|---|
| 2 | Office | 0km | 0 |
| 3 | Amusement park | 10km | 1.0 |
| 4 | Downtown | 5km | 0.5 |

FIG. 16

Past similar scene information

| Scene ID | Scene time information | Scene participant information | Scene place information ||| |
|---|---|---|---|---|---|
| | | | Latitude | Longitude | Landmark information |
| 11 | 2006/5/3 9:00~10:00 | B | N34° 35' 00 | W135° 20' 30 | Home |
| 64 | 2007/3/4 10:00~15:00 | A, B | N34° 37' 30 | W135° 20' 30 | Office |
| 36 | 2007/5/3 15:00~18:00 | A, C, D | N34° 38' 00 | W135° 13' 30 | Amusement park |
| 7 | 2006/12/27 18:00~19:00 | C | N34° 37' 00 | W135° 17' 00 | Downtown |

FIG. 17

Results of sorting photographer IDs
and scene IDs for each participant

| Scene ID | Photographer ID | Participant ID |
|---|---|---|
| 2 | X | A |
|   | X | B |
| 3 | X | A |
|   | X | C |
|   | X | D |
| 4 | X | C |

FIG. 18

| Scene ID | Photographer ID | Participant ID | Time weight value | Number-of-participant weight value | Place weight value | Scene weight coefficient | Number-of-participant weight coefficient | Evaluation value (Total) |
|---|---|---|---|---|---|---|---|---|
| 2 | X | A | 1.0 | 0.66 | 0 | 0.5 | 0.5 | 2.66 |
|   | X | B |     |      |   |     | 0.5 | 2.66 |
| 3 | X | A | 0.6 | 0.5  | 1.0 | 0.4 | 0.6 | 3.1 |
|   | X | C |     |      |   |     | 0.6 | 3.1 |
|   | X | D |     |      |   |     | 0.35 | 2.85 |
| 4 | X | C | 0.2 | 1.0 | 0.5 | 0.3 | 0.7 | 2.7 |

Scene evaluation value / Participant evaluation value

Cumulative value of evaluation values in one scene pertaining to participant A

| Participant ID | Evaluation value (Total) |
|---|---|
| A | 5.76 |
| B | 2.66 |
| C | 5.8 |
| D | 2.85 |

Total value of Cumulative values in all scenes pertaining to A

FIG. 19

| Scene ID | Participant ID1 | Participant ID2 |
|---|---|---|
| 2 | A | B |
| 3 | A | C |
| | A | D |
| | A | D |
| | C | D |

FIG. 21

| Participant ID | X | A | B | C | D |
|---|---|---|---|---|---|
| X | | | | | |
| A | 5.76 | | | | |
| B | 2.66 | 2.41 | | | |
| C | 5.8 | 2.9 | 0 | | |
| D | 2.85 | 2.85 | 0 | 2.85 | |

FIG. 32

| Image ID | Photographer ID |
|---|---|
| 1 | X |
| 2 | X |
| 3 | A |
| 4 | A |

FIG. 33

| Image ID | Participant ID |
|---|---|
| 1 | – |
| 2 | A, B |
| 3 | C, D, X |
| 4 | C, X |

FIG. 34

| Participant ID | X | A | B | C | D |
|---|---|---|---|---|---|
| X |  |  |  |  |  |
| A | 3 |  |  |  |  |
| B | 1 | 1 |  |  |  |
| C | 2 | 2 | 0 |  |  |
| D | 1 | 1 | 0 | 1 |  |

VIDEO ANALYSIS APPARATUS AND METHOD FOR CALCULATING INTERPERSONAL RELATIONSHIP EVALUATION VALUE USING VIDEO ANALYSIS

TECHNICAL FIELD

The present invention relates to a video data analysis technique, and in particular, to a technique for obtaining indexes used for classifying and organizing video data by analyzing the video data.

BACKGROUND ART

In recent years, there has been a drastic increase in the accumulated amount of video data due to digitalization of video data. Accordingly, there is a need for a technique to classify and organize video data with little effort.

Conventionally, album software that supports classification and organization is provided for still image data. Still image data in the JPEG format has Exif information such as an image-capturing time and position information acquired using a GPS (hereinafter, referred to as GPS data) appended thereto, and some conventional album software uses information included in the Exif information as indexes for classification and organization of the still image data.

Another classification method for still image data uses image analysis (for example, Patent Document 1). According to the technique disclosed in Patent Document 1, indexes for classification and organization of still image data are obtained in the following manner: persons image-captured in still image data are recognized using a face recognition technique or the like; interpersonal relationships are estimated based on the number of pieces of still image data in which a particular person is captured, and values indicating the estimated interpersonal relationships are used as the above-mentioned indexes.

The still image data targeted for the classification and the organization according to such a technique is still image data captured for personal use. Such image data is often obtained in a commemorative photo session where the photographer holds the image-capturing device when he/she intends to, actively determines a composition of an image, and captures the image. Capturing times of such still image data for personal use captured as commemorative photos are chronologically scattered. However, it is expected that people who accompanied the photographer to the capturing place are appropriately captured in the images. Accordingly, interpersonal relationships at the time of the image-capturing can be estimated.

[Citation List]
[Patent Literature]
[Patent Literature 1]

Japanese Patent Application Publication 2006-81021 (item 5, first figure).

SUMMARY OF INVENTION

Technical Problem

Video data such as moving image data contain numerous still images (hereinafter, referred to as frame images) sequentially captured in a period of time.

However, the same person may not be captured in all of the frame images during a capturing period due to camera work or movements of the person. Thus, someone who was present at the image-capturing place maybe out of the image-capturing range time to time, and accordingly, is not contained in some frame images.

Assume that the technique disclosed by Patent Document is applied to the moving image data here. People image-captured in each frame image in the moving image data are identified, and interpersonal relationships are estimated based on the number of frame images which contain a particular person. In this case, some people may be evaluated low even though they were present at the image-capturing place.

Thus, index values obtained by applying such a technique to moving image data cannot provide appropriate indexes for classification and organization of moving image data.

Especially, when a wearable terminal is used for image-capturing, this problem becomes more prominent since the user does not actively perform image-capturing operations.

The present invention aims to provide a video analysis apparatus that obtains appropriate indexes for classification and organization of video data by video analysis, and an evaluation value calculation method for obtaining appropriate indexes for classification and organization of video data.

Solution to Problem

In order to achieve the stated aim, one aspect of the present invention is an image analysis apparatus comprising: an identification unit operable to, in each of a plurality of scenes, identify one or more persons who appear in the scene; a scene evaluation value calculation unit operable to calculate a scene evaluation value for, among the plurality of scenes, each scene in which at least one person has been identified, the one person being included as one of persons identified by the identification unit; a scene selection unit operable to select, from among the plurality of scenes, one or more scenes that include the one person; and a person evaluation value calculation unit operable to calculate a person evaluation value for the one person by summating scene evaluation values of the scenes selected by the scene selection unit.

Here, each scene is, for example, composed of a plurality of frame images included in moving image data or composed of a collection of a plurality of pieces of still image data.

Advantageous Effects of Invention

According to the above-described structure for solving the stated aim, each person can be identified not for each frame image but for each scene, and a person evaluation value with respect to the identified person can be obtained by summating scene evaluation values respectively calculated for scenes.

Accordingly, for example, even if a person who has been identified in a scene is not image-captured in the scene for a period of time, he/she is assigned a scene evaluation value of the scene, as are other persons identified in the scene. This is because a scene evaluation value is calculated for each scene, and the scene evaluation value of a scene is the same for all the persons identified in the scene.

Thus, it is unlikely that the relationship between a person who was present at the image-capturing place and the photographer is highly underestimated even if the person was not captured in the scene all the time. As a result, appropriate indexes for classifying and organizing video data can be obtained.

Meanwhile, although the photographer is not captured in image data, he/she must be present at the image-capturing place. However, the technique disclosed by Patent Document 1 is directed to relationships among captured persons, and is not capable of evaluating relationships between each captured person and the photographer who does not appear in the images.

In view of the above, according to the image analysis apparatus which is one aspect of the present invention, it is preferable that the person evaluation value indicates a degree of intimacy between a photographer of the scenes that include the one person, and the one person, and the higher the person evaluation value, the higher the degree of intimacy.

With the stated structure, a relationship between the photographer of the scene that includes a person, and the person is calculated as a person evaluation value. Accordingly, for example, even in a case where multiple persons take turns capturing moving image data, a degree of intimacy between each photographer and a predetermined person who appears in the moving image data can be calculated as a person evaluation value.

Also, according to the image analysis apparatus which is one aspect of the present invention, the one person and another person may have been identified in each of the scenes that include the one person, the person evaluation value indicates a degree of intimacy between the one person and the another one person, and the higher the person evaluation value, the higher the degree of intimacy.

With the stated structure, a degree of intimacy between an identified person and another identified person can be calculated as a person evaluation value.

BRIEF DESCRIPTION OF DRAWINGS

FIG. 6 shows profile information;
FIG. 7 shows a data structure of reference place information;
FIG. 9 shows scene time information;
FIG. 10 shows scene participant information;
FIG. 11 shows scene place information;
FIG. 12 shows scene photographer information;
FIG. 13 shows time weight values in correspondence with scene IDs;
FIG. 14 shows number-of-participant weight values in correspondence with the scene IDs;
FIG. 15 shows place weight values in correspondence with the scene IDs;
FIG. 16 shows similar scene information;
FIG. 17 shows photographer-participant shared scene information;
FIG. 18 shows photographer-participant evaluation value information;
FIG. 19 shows participant-participant shared scene information;
FIG. 21 shows evaluation value information;
FIG. 31 is a block diagram showing a functional structure of a video analysis apparatus 2a;
FIG. 32 shows photographer information;
FIG. 33 shows participant information;
FIG. 34 shows evaluation value information;
and
FIG. 35 is a flowchart showing operations of the video analysis apparatus 2a.

Figure 1:
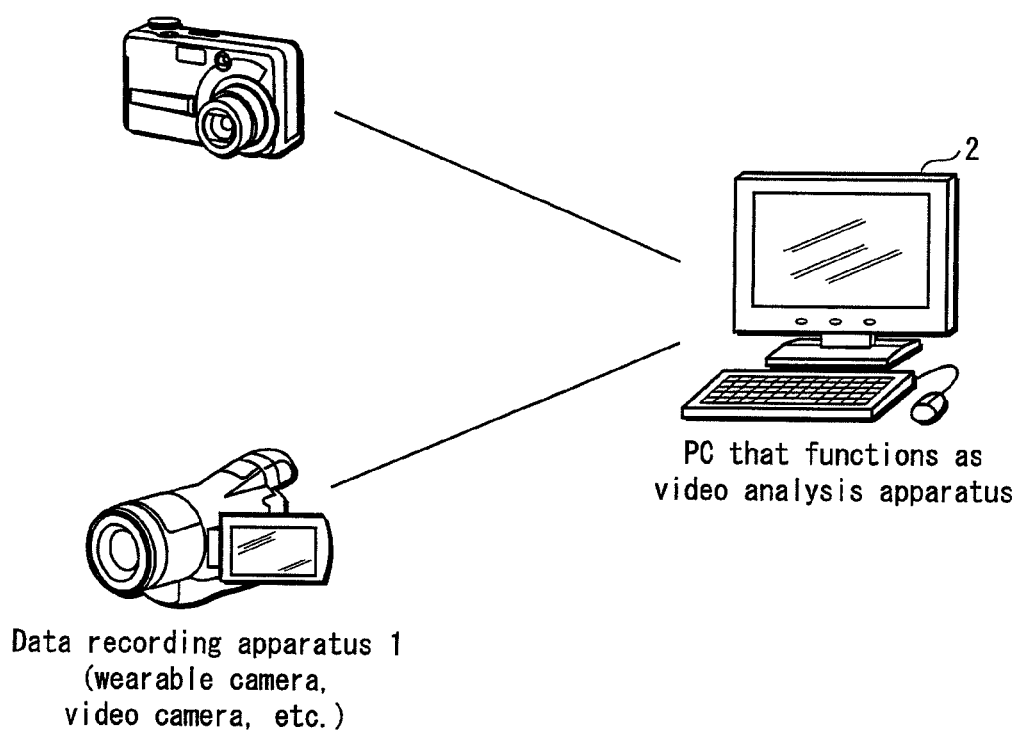
FIG. 1 shows a classification and organization system to which a video analysis apparatus 2 pertaining to the present invention is applied.

REFERENCE SIGNS LIST 1 data recording apparatus
2 video analysis apparatus
201 CPU
202 ROM
203 CRT
204 keyboard
205 communication I/F
206 RAM
207 HDD
208 mouse
310 database unit
311 moving image data storage unit
312 audio/face information storage unit
313 map information storage unit
314 reference place information storage unit
315 photographer information storage unit
320 recorded information analysis unit
321 scene time information generation unit
322 scene participant information generation unit
322a participant information generation unit
323 scene place information generation unit
324 scene photographer information generation unit
324a photographer information generation unit
330 scene weight value calculation unit
331 scene time weight value calculation unit
332 scene number-of-participant weight value calculation unit
333 scene place weight value calculation unit
340 similar scene information extraction unit
341 extraction unit
342 scene information storage unit
350 intra-scene photographer-participant evaluation value calculation unit
350a photographer-participant evaluation value calculation unit
351 shared scene detection unit
352 intra-scene evaluation value calculation unit
360 intra- scene participant-participant evaluation value calculation unit
360a participant-participant evaluation value calculation unit
361 shared scene detection unit
362 scene evaluation value calculation unit
370, 370a evaluation value information storage unit

DESCRIPTION OF EMBODIMENTS

In the following, embodiments of the present invention are described with reference to the drawings.

[First Embodiment]

1. Overall Structure

First, an outline of a classification and organization system is described.

FIG. 1 shows the classification and organization system to which a video analysis apparatus 2 pertaining to the present invention is applied.

A personal computer 2 that reads programs and functions as a video analysis apparatus is connected with a data recording apparatus 1 such as a wearable camera or a video camera via a USB cable.

The data recording apparatus 1 is composed of a camera, a microphone, and the like, and records moving image data captured using the camera, the microphone, and the like onto a recording medium. The data recording apparatus 1 also outputs the recorded moving image data to the video analysis apparatus 2.

The video analysis apparatus 2 analyzes moving image data input from the data recording apparatus 1 and obtains indexes for classifying and organizing the moving image data. Specifically, for each of scenes having been obtained by dividing moving image data by a predetermined time section, the video analysis apparatus 2 identifies one or more persons who appear in the scene and calculates a scene evaluation value. Here, each person who appears in the scene is a person who is captured in no less than a predetermined number of frame images constituting the scene, or a person who is captured in a predetermined ratio of frame images out of all frame images constituting the scene (hereinafter, also referred to as "captured person"). Subsequently, the video analysis apparatus 2 detects, from among all the scenes, one or more scenes related to one of the identified captured persons and summates scene evaluation values of the detected scenes to obtain a person evaluation value with respect to the one of the captured persons.

Also, the video analysis apparatus 2 classifies and organizes the moving image data based on the person evaluation value with respect to each captured person.

It should be noted that in the present embodiment, video analysis is performed particularly on moving image data captured using a wearable camera.

In the following, the video analysis apparatus 2 is described in details with reference to the drawings.

2. Structure of Video Analysis Apparatus 2

2.1. Hardware Structure

Figure 2:
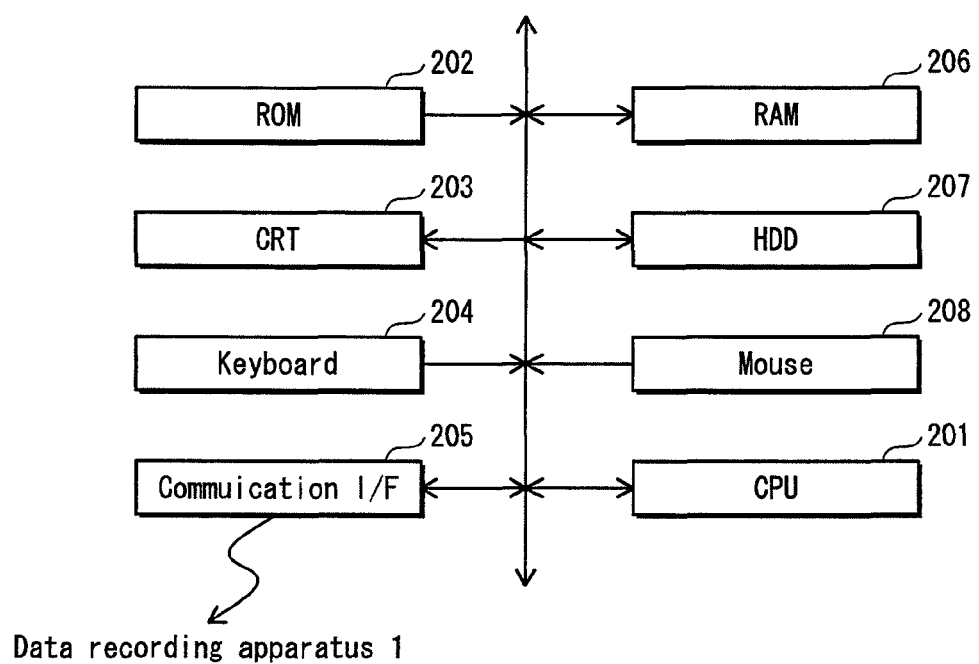
FIG. 2 shows a hardware structure of the video analysis apparatus 2.

FIG. 2 shows the hardware structure of the video analysis apparatus 2. The video analysis apparatus 2 includes a CPU 201, a ROM 202, a RAM 206, a CRT display 203, a keyboard 204, a communication interface 205, a hard disk 207, and a mouse 208 that are communicably connected with one another via a bus.

The communication interface 205 is connected with, for example, a USB cable, and acquires moving image data from the data recording apparatus 1.

The hard disk 207 stores OS, album software, image recognition software, control programs, application software, and programs such as a browser, and further stores various data and threshold values. The control programs relate to video analysis such as scene division, generation of scene weight values, extraction of scene information, and calculation of evaluation values. The application software communicates with the data recording apparatus 1 such as the wearable camera and the video camera, and reads/outputs moving image data and the like from/to these devices. The various data and threshold values are used for video analysis. The OS is activated upon power being turned ON, programs specified by activation instructions from the keyboard 204 and the mouse 208 are read onto the RAM 206, and the CPU 201 interprets and executes the read programs on the RAM 206.

2.2 Functional Structure

Figure 3:
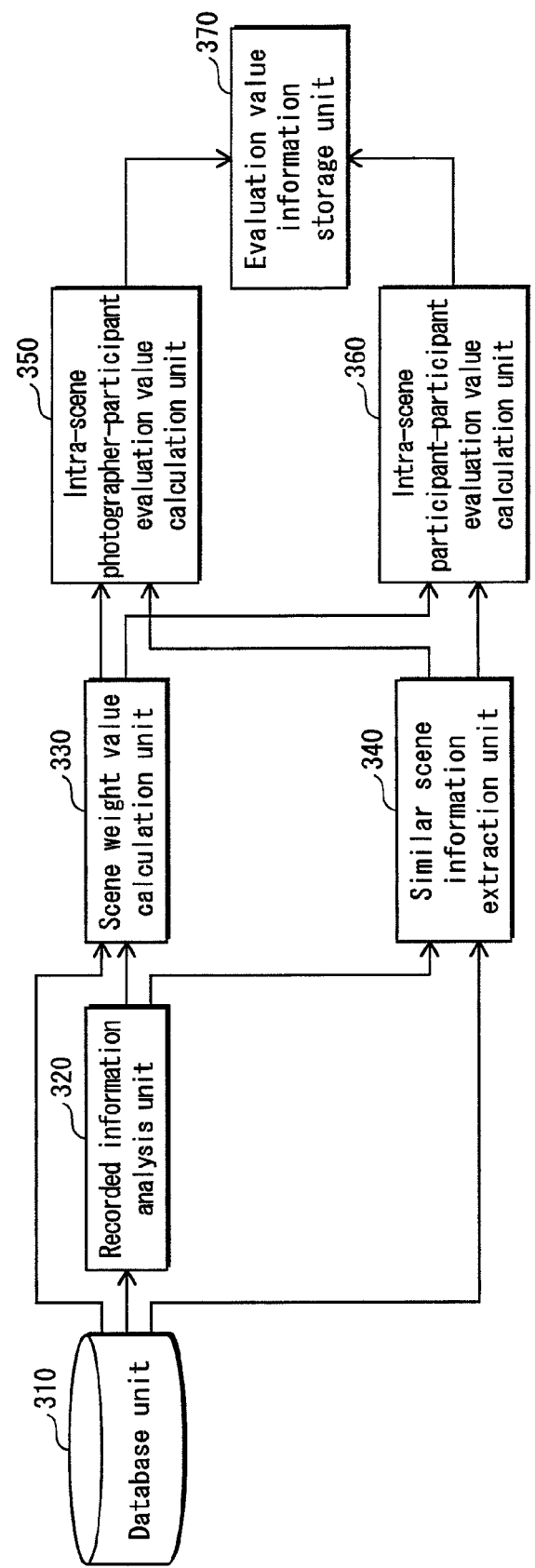
FIG. 3 is a block diagram showing a functional structure of the video analysis apparatus 2.

The following describes functions that are achieved as the CPU 201 operates according to the control programs stored in the hard disk 207. FIG. 3 is a block diagram showing the functional structure of the video analysis apparatus 2. As shown in FIG. 3, the video analysis apparatus 2 includes a database unit 310, a recorded information analysis unit 320, a scene weight value calculation unit 330, a similar scene information extraction unit 340, an intra-scene photographer-participant evaluation value calculation unit 350, an intra-scene participant-participant evaluation value calculation unit 360, and an evaluation value information storage unit 370.

Specifically, the database unit 310 includes the hard disk 207 and the like and stores various data used for the present invention, such as moving image data. Details of the various data will be described in "2.2.1. Database Unit 310" later.

The recorded information analysis unit 320 reads moving image data from the database unit 310, analyzes the read moving image data, generates information pieces related to scenes which are used by the scene weight value calculation unit 330 for calculating weight values and by the similar scene information extraction unit 340 for extracting similar scenes. The recorded information analysis unit 320 outputs the generated information pieces to the scene weight value calculation unit 330 and the similar scene information extraction unit 340. Details of an analysis method for analyzing moving image data and the information pieces generated based on the analysis will be described in "2.2.2. Recorded Information Analysis Unit 320" later.

The scene weight value calculation unit 330 calculates a weight value for each scene using information pieces input from the recorded information analysis unit 320, and outputs the calculated weight values to the intra-scene photographer-participant evaluation value calculation unit 350 and the intra-scene participant-participant evaluation value calculation unit 360. Details will be described in "2.2.3. Scene Weight Value Calculation Unit 330".

The similar scene information extraction unit 340 (i) extracts, from among scene information pieces of scenes pertaining to other moving image data stored in the database unit 310, one or more scene information pieces similar to one or more scene information piece of each scene pertaining to the moving image data targeted for analysis, based on information pieces input from the recorded information analysis unit 320, and (ii) outputs the result of the extraction to the intra-scene photographer-participant evaluation value calculation unit 350 and the intra-scene participant-participant evaluation value calculation unit 360.

The intra-scene photographer-participant evaluation value calculation unit 350 calculates an evaluation value that indicates a relationship between the photographer who image-captured the moving image data targeted for analysis and each participant who participates in the scene as a captured person, based on the weight value for each scene input from the scene weight value calculation unit 330 and one or more scene information pieces input from the similar scene information extraction unit 340. The intra-scene photographer-participant evaluation value calculation unit 350 then outputs the calculated evaluation values to the evaluation value information storage unit 370.

The intra-scene participant-participant evaluation value calculation unit 360 calculates evaluation values that indicate relationships among participants who participate in the scene as captured persons, based on the weight value for each scene input from the scene weight value calculation unit 330 and the one or more scene information pieces input from the similar scene information extraction unit 340, and outputs the calculated evaluation values to the evaluation value information storage unit 370.

The evaluation value information storage unit 370 stores the following in correspondence with each other: the evaluation values indicating the relationships between the photographer and each participants input from the intra-scene photographer-participant evaluation value calculation unit 350; and the evaluation values indicating the relationships among the participants input from the intra-scene participant-participant evaluation value calculation unit 360. Details will be described in "2.2.7. Evaluation Value Information Storage Unit 370" later.

Figure 4:
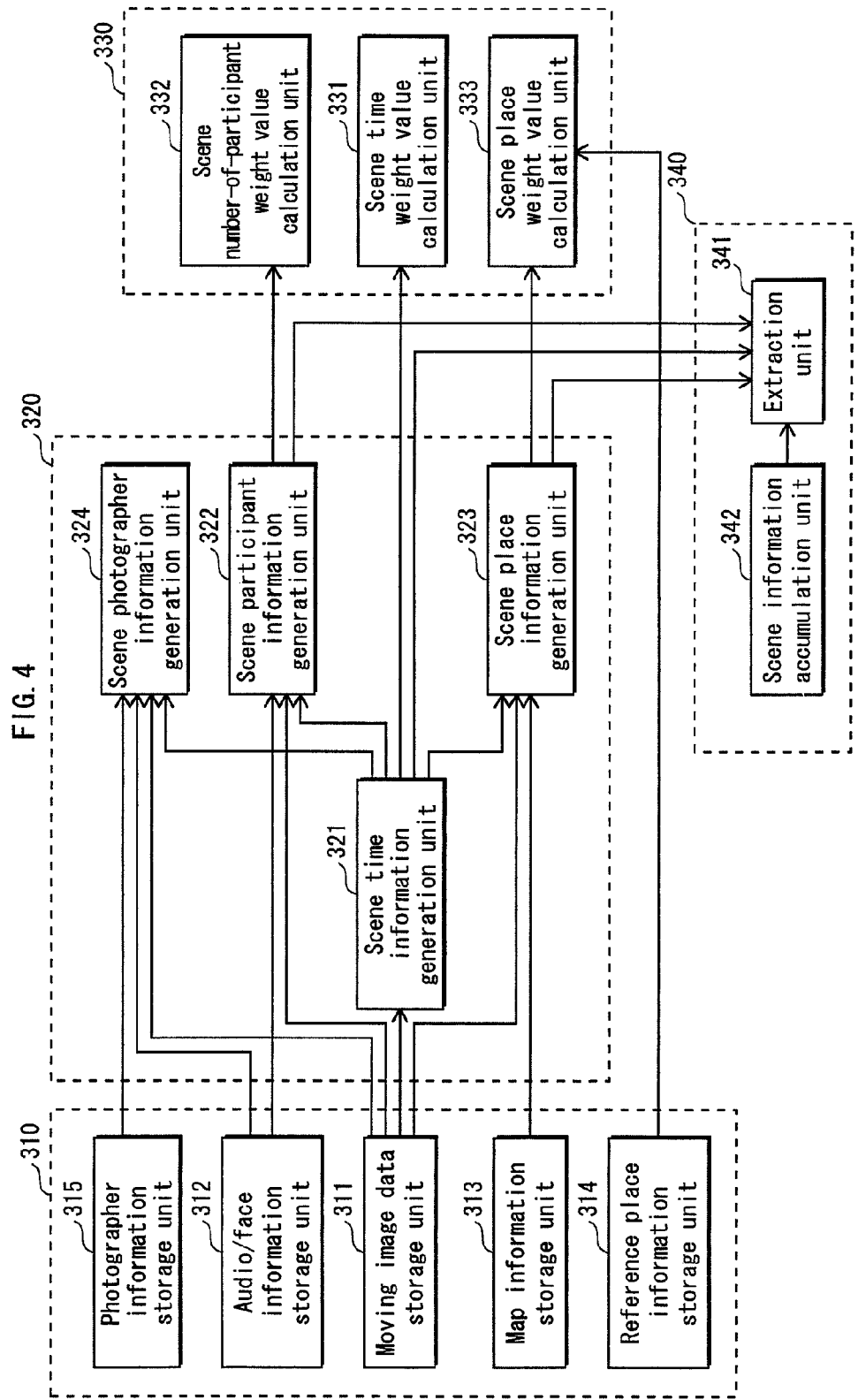
FIG. 4 is a block diagram showing details of the functional structure of the video analysis apparatus 2.
Figure 5:
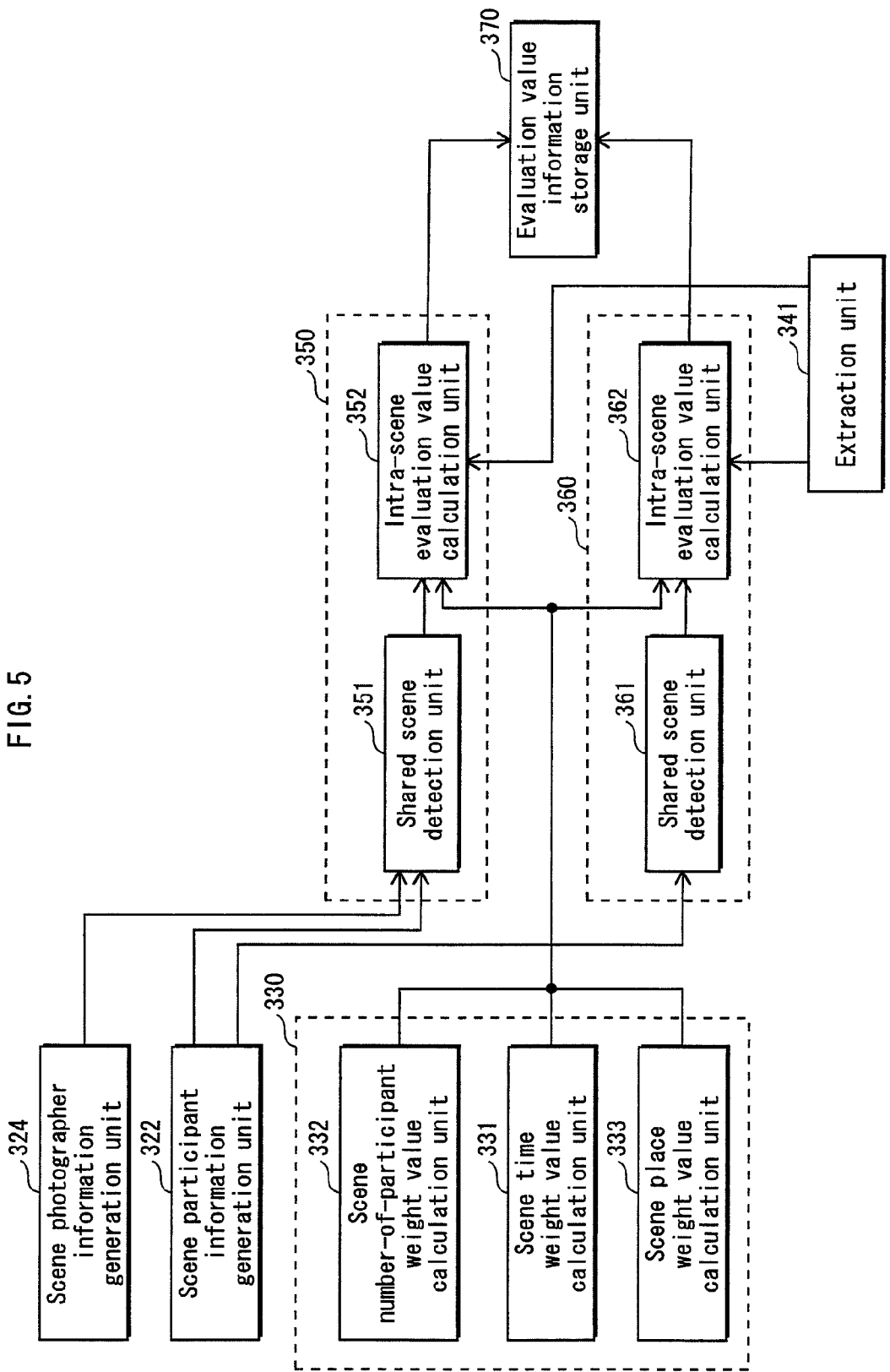
FIG. 5 is a block diagram showing details of the functional structure of the video analysis apparatus 2.

In the following, each functional block is described in further detail using FIGS. 4 and 5. FIGS. 4 and 5 show further details of the functional block diagram of FIG. 3.

2.2.1. Database Unit 310

As shown in FIG. 4, the database unit 310 includes a moving image data storage unit 311, an audio/face information storage unite 312, a map information storage unit 313, a reference place information storage unit 314, and a photographer information storage unit 315.

The moving image data storage unit 311 stores the moving image data captured by the data recording apparatus 1 in correspondence with position information (latitude and longitude) acquired using GPS provided in the data recording apparatus 1.

The audio/face information storage unit 312 stores profile information pertaining to multiple persons which is used for recognition. FIG. 6 shows profile information. As shown in FIG. 6, the profile information associates, for each of multiple people, a face information piece used for face image recognition, an audio information piece used for speaker recognition, and a person identifier for identifying a person, in correspondence with one another.

The map information storage unit 313 stores map information that associates each position information piece with the name of the position (hereinafter, referred to as "landmark information"), a type, and the like.

The reference place information storage unit 314 stores reference place information. FIG. 7 shows a data structure of reference place information. As shown in FIG. 7, the reference place information associates, for example, home, office, or the like where the user is often present, with the position information thereof.

The photographer information storage unit 315 stores person identifiers for identifying the person who captured the video. When the video was captured with a wearable camera, the person identifier indicating the owner of the wearable camera is stored in advance as the photographer.

2.2.2. Recorded Information Analysis Unit 320

As shown in FIG. 4, the recorded information analysis unit 320 includes a scene time information generation unit 321, a scene participant information generation unit 322, a scene place information generation unit 323, and a scene photographer information generation unit 324.

The scene time information generation unit 321 reads moving image data to be analyzed from the moving image data storage unit 311, divides the read moving image data into multiple scenes, and generates scene time information pieces. The scene time information generation unit 321 outputs the generated scene time information pieces to the scene participant information generation unit 322, the scene place information generation unit 323, the scene photographer information generation unit 324, an extraction unit 341, and a time weight value calculation unit 331.

When dividing the moving image data into multiple scenes, for example, based on image information, the scene time information generation unit 321 sequentially analyzes image information for each frame image constituting the moving image data and determines division points based on changes of the overall color of the captured image. Details will be described in "4.2. Scene Division Processing".

Figure 8:
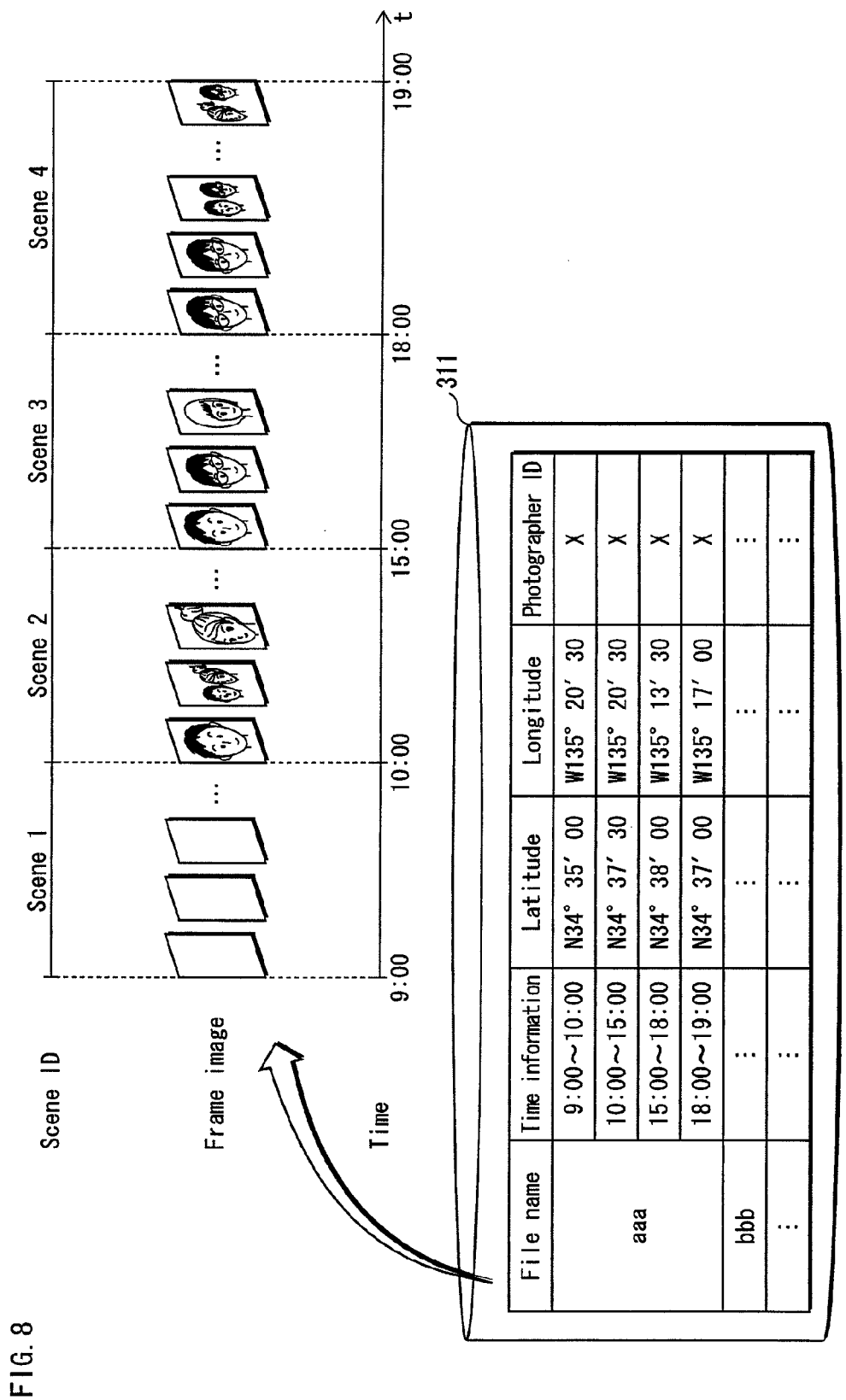
FIG. 8 shows a relationship between moving image data, frame images that constitute the moving image data, and scenes.

FIG. 8 shows a relationship between moving image data, frame images that constitute the moving image data, and scenes.

As shown in FIG. 8, moving image data having a file name of aaa stored in the moving image data storage unit 311 is divided into scenes at, for example, time points 10:00, 15:00, and 18:00. At each time point, the overall color of the frame image changes significantly. As is apparent from the above, the moving image data having the file name of aaa is composed of four scenes obtained by dividing the moving image data in the time axis direction thereof, and each scene is composed of multiple frame images.

FIG. 9 shows scene time information. As shown in FIG. 9, each scene time information piece associates, for one of multiples scenes, a scene identifier (ID) for identifying the scene, and time information (start time and end time) of the scene. Here, each scene ID may be a value determined to be unique to a scene.

The scene participant information generation unit 322 reads the moving image data to be analyzed from the moving image data storage unit 311, and then, for each scene indicated by a scene time information piece input from the scene time information generation unit 321, specifies one or more people who were acting together with the photographer of the scene as participants, and generates a scene participant information piece. Subsequently, the scene participant information generation unit 322 outputs the generated participant information to a number-of-participant weight value calculation unit 332, the extract ion unit 341, and shared scene detection units 351 and 361.

Participants in each scene are specified in the following manner. First, for each frame image constituting the scene, a face image of each person is detected. Specifically, one or more subjects captured in the image are detected by performing known image processing such as contour definition processing, color distribution analysis processing, or the like. Following that, characteristics amounts unique to human faces are detected in each image indicating a detected subject, thereby detecting one or more portions of the image which each show a human face.

Subsequently, it is judged whether each detected human face image matches any of the face images of the people stored in the audio/face information storage unit 312, using a face image recognition technique. When the face image of the person judged to match the detected face image is included in no less than a predetermined number of frame images of the scene, the person is judged to be a participant of the scene.

It should be noted that even if the detected face image does not match any of the face images stored in the audio/face information storage unit 312, the person to which the detected face image pertains can still be judged as a participant in a case where the person appears in the scene no less than the predetermined number of frame images. In this case, the face image of the person judged be a participant can be added to the audio/face information storage unit 312.

FIG. 10 shows scene participant information. As shown in FIG. 10, each scene participant information piece associates, for one of the multiple scenes, a scene identifier (ID) that identifies the scene with one or more participant IDs that each indicate a person judged to be a participant of the scene. Here, each participant ID may be a value determined to be unique to a participant.

The scene place information generation unit 323 reads the position information corresponding to the moving image data to be analyzed from the moving image data storage unit 311, generates a scene place information piece for each scene indicated by the scene time information piece input from the scene time information generation unit 321 based on the position information, and outputs the generated scene place information piece to the extraction unit 341 and a scene place weight value calculation unit 333.

Specifically, the scene place information generation unit 323 detects position information at the time corresponding to each scene from GPS data associated with the moving image data stored in the moving image data storage unit 311, and compares the position information with the map information stored in the map information storage unit 313, thereby obtaining the landmark information corresponding to the position information, from the map information.

FIG. 11 shows scene place information. As shown in FIG. 11, each scene place information piece associates, for one of the multiple scenes, a scene identifier (ID) that identifies the scene, the latitude and the longitude of the scene, and the landmark information of the scene with one another.

The scene photographer information generation unit 324 reads the moving image data to be analyzed from the moving image data storage unit 311, specifies a person who captured the scene as the photographer, for each scene indicated by a scene time information piece input from the scene time information generation unit 321, and generates a scene photographer information piece.

Specifically, the scene photographer information generation unit 324 determines the person indicated by the scene photographer information stored in the scene photographer information storage unit 315 as the photographer of the scene. It should be noted that a scene photographer information piece is stored in correspondence with moving image data in advance by a user input when the moving image data is captured.

FIG. 12 shows scene photographer information. As shown in FIG. 12, each scene photographer information piece associates, for one of the multiple scenes, a scene identifier (ID) that identifies the scene with a photographer ID that indicates the person judged to be the photographer of the scene. Here, each photographer ID may be a value determined to be unique to each scene. In the present embodiment, video analysis is performed on moving image data captured using a wearable camera. Accordingly, it is assumed that the photographer is the same for all the scenes.

2.2.3. Scene weight Value Calculation Unit 330 As shown in FIGS. 4 and 5, the scene weight value calculation unit 330 includes a scene time weight value calculation unit 331, a scene number-of-participant weight value calculation unit 332, and a scene place weight value calculation unit 333.

The scene time weight value calculation unit 331 calculates a time weight value for each scene based on a scene time information piece input from the scene time information generation unit 321. Specifically, the scene time weight value calculation unit 331 generates a time length based on the time information corresponding to each scene ID, and calculates a time weight value of each scene based on the time length. For example, in a case where the longer the time length is, the higher the weight is, a time weight value $R_T$ is, as expressed in (Equation 1) below, a value obtained by multiplying a time length T of the scene by a constant a (assumed to be 0.2 here).

$$R_T = \alpha T \qquad \text{(Equation 1)}$$

FIG. 13 shows time weight values in correspondence with scene IDs. Here, time weight values of the scene IDs 2, 3, and 4 are 1.0, 0.6, and 0.2, respectively. The scene time weight value calculation unit 331 outputs the respective time weight values to intra-scene evaluation value calculation units 352 and 362.

The scene number-of-participant weight value calculation unit 332 calculates a number-of-participant weight value for each scene based on a scene participant information piece input from the scene participant information generation unit 322. Specifically, in order to calculate the number-of-participant weight values, the scene number-of-participant weight value calculation unit 332 first calculates the total number of participants for each scene. Note that the photographer is also counted as a participant here. Next, a number-of-participant weight value is calculated for each scene in accordance with the number of participants. For example, in a case where the smaller the number of participants for the scene is, the higher the weight is, a number-of-participant weight value $R_N$ is a value obtained by multiplying the inverse number of a number of scene participants N by a constant β (assumed to be 2 here), as expressed by (Equation 2) below.

$$R_N = \beta(1/N) \qquad \text{(Equation 2)}$$

FIG. 14 shows number-of-participant weight values in correspondence with the scene IDs.

Here, the number-of-participant weight values of the scene IDs 2, 3, and 4 are 0.66, 0.5, and 1.0, respectively.

The scene number-of-participant weight value calculation unit 332 outputs the respective number-of-participant weight values to the intra-scene evaluation value calculation units 352 and 362.

The scene place weight value calculation unit 333 calculates a place weight value for each scene based on the scene place information input from the scene place information generation unit 323 and the reference place information input from the reference place information storage unit 314. Specifically, the scene place weight value calculation unit 333 calculates a distance between two points based on the latitude and the longitude of each scene of the scene place information and the latitude and the longitude of the reference place information. Subsequently, the scene place weight value calculation unit 333 calculates a place weight value of each scene according to the distance between the position of the scene and the reference position. For example, in a case where the further the distance from the reference position is, the higher the weight is, and the weight is low when the scene is shared at the reference position, a place weight coefficient $R_L$, is a value obtained by multiplying a distance L from the reference position by a constant γ (assumed to be 0.1 here), as expressed by (Equation 3) below.

$$R_L = \gamma L \qquad \text{(Equation 3)}$$

FIG. 15 shows scene weight values in correspondence with the scene IDs. Here, the scene weight values of the scenes IDs 2, 3, and 4 are 0.1, 0, and 0.5, respectively.

The scene place weight value calculation unit 333 outputs the respective scene weight values to the intra-scene evaluation value calculation units 352 and 362.

2.2.4. Similar Scene Information Extraction Unit 340

As shown in FIG. 4, the similar scene information extraction unit 340 includes the extraction unit 341 and a scene information accumulation unit 342.

Upon receiving information pieces related to scenes, from the recorded information analysis unit 320, the extraction unit 341 accesses, for each scene, scene information pieces of each scene pertaining to other moving image data in past, accumulated in the scene information accumulation unit 342, and calculates degrees of similarities between each scene information piece of the scene pertaining to the moving image data targeted for analysis and scene information pieces of the scene pertaining to the other moving image data. As the degrees of similarities between scene information pieces, a degree of temporal similarity, a degree of participant similarity, and a degree of place similarity are calculated.

The degree of temporal similarity is calculated according to similarity of the dates and the time zones when the scenes were recorded.

The degree of participant similarity is calculated according to a degree of coincidence of the scene participant information pieces.

The degree of place similarity is calculated according to the distance between the places indicated in the scene place information pieces, a similarity of landmark information, and the like.

The extraction unit 341 outputs, from among the scene information pieces accumulated in the scene information accumulation unit 342, a predetermined number of scene information pieces having higher degrees of similarities as similar scene information pieces to an intra-scene photographer-participant evaluation value calculation unit 350 and an intra-scene participant-participant evaluation value calculation unit 360.

FIG. 16 shows similar scene information. As shown in FIG. 16, each similar scene information piece is composed of a scene ID, a scene time information piece, a scene participant information piece, and a scene place information piece. The similar scene information pieces are output arranged in the descending order of the degree of similarities. Note that numerical values indicating the degree of similarity of the similar scene information pieces can be output as well.

The scene information accumulation unit 342 accumulates scene information pieces of scenes pertaining to other moving image data captured in the past.

2.2.5. Intra-scene Photographer-Participant Evaluation Value Calculation Unit 350

As shown in FIG. 5, the intra-scene photographer-participant evaluation value calculation unit 350 includes a shared scene detection unit 351 and an intra-scene evaluation value calculation unit 352.

The shared scene detection unit 351 detects one or more scenes that contains at least one participant other than the photographer as shared scenes, based on scene participant information pieces input from the scene participant information generation unit 322, and scene photographer information pieces input from the scene photographer information generation unit 324, and generates photographer-participant shared scene information. The shared scene detection unit 351 transmits the generated photographer-participant shared scene information to the intra-scene evaluation value calculation unit 352.

FIG. 17 shows photographer-participant shared scene information. Since the photographer participates in all the scenes, pairs each composed of the photographer and a different one of the participants is generated for each scene. It should be noted that evaluation value calculation processing is not performed for any scenes which include no participant other than the photographer. Accordingly, such scenes are not detected as shared scenes. Thus, the scene having the scene ID of 1 which includes no participant other than the photographer has no photographer-participant pair, and consequently, is not detected as a shared scene.

The intra-scene evaluation value calculation unit 352 calculates intra-scene photographer-participant evaluation value information based on the various weight values input from the scene weight value calculation unit 330, the similar scene information pieces input from the similar scene information extraction unit 340, and the photographer-participant shared scene information input from the shared scene detection units 351, and outputs the calculated intra-scene photographer-participant evaluation value information to the evaluation value information storage unit 370. Details of the processing will be described in "4.4. Intra-scene Photographer-Participant Evaluation Value Calculation Processing" later.

FIG. 18 shows intra-scene photographer-participant evaluation value information. The intra-scene photographer-participant evaluation value information includes a scene evaluation value (the time weight value, the number-of-participant weight value, the scene weight value, and the scene weight coefficient calculated for each scene based on the similar scene information pieces) and a participant evaluation value (the participant weight coefficient calculated for each participant of each scene), in addition to the photographer-participant shared scene information.

The scene evaluation value of each participant of each scene can be obtained by calculating the total value of the time weight value, the number-of-participant weight value, the place weight value, the scene weight coefficient of the scene, and the participant weight coefficient.

Note that when calculating the scene evaluation value, the total value may be calculated after weighing the time weight value, the number-of-participant weight value, and the scene weight value. Details will be described in "4.4. Intra-scene Photographer-Participant Evaluation Value Calculation Processing" later. Here, for the sake of simplification, the explanation is continued under the assumption that the total value is calculated without weighing the above-mentioned weight values.

Here, let $R_{AS}$ be the evaluation value of the pair of a photographer X and a participant A in a scene S. Then, an evaluation value $R_A$ of the pair of the photographer X and the participant A. with respect to all the scenes is obtained by summating an evaluation value $R_{An}$ of each shared scene, as expressed by (Equation 5) below.

$$R_A = \Sigma R_{An} \quad \text{(Equation 5)}$$

In other words, by summating evaluation values of the same pair of the photographer and a participant in all of the scenes, evaluation values 5.76, 2.66, 5.8, and 2.85 are eventually obtained for the participants IDs A, B, C, and D, respectively.

2.2.6. Intra-scene Participant-Participant Evaluation Value Calculation Unit 360

As shown in FIG. 5, the intra-scene participant-participant evaluation value calculation unit 360 includes the shared scene detection unit 361 and the intra-scene evaluation value calculation unit 362.

The shared scene detection unit 361 detects one or more scenes which include two or more participants other than the photographer as shared scenes, based on scene participant information pieces, and generates participant-participant shared scene information. The shared scene detection unit 361 transmits the generated participant-participant shared scene information to the intra-scene evaluation value calculation unit 362.

FIG. 19 shows participant-participant shared scene information. Any scenes which include no more than one participant other than the photographer are not detected as shared scenes here because participant-participant evaluation value calculation processing is not performed for such scenes. Accordingly, the scene having the scene ID of which includes only one participant other than the photographer has no participant-participant pair, and consequently, is not detected as a shared scene. When the number of participants is three or more, all the possible pairs of two participants are generated.

The intra-scene evaluation value calculation unit 362 calculates intra-scene participant-participant evaluation value information based on the following: the weight values input from the scene weight value calculation unit 330, the similar scene information pieces input from the similar scene information extraction unit 340, and the participant-participant shared scene information input from the shared scene detection unit 361. Subsequently, the intra-scene evaluation value calculation unit 362 outputs the calculated participant-participant shared scene information to the evaluation value information storage unit 370. Details of the processing will be described in "4.5. Intra-scene Participant-Participant Evaluation Value Calculation Processing" later.

Figure 20:
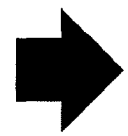
FIG. 20 shows participant-participant evaluation value information.

FIG. 20 shows intra-scene participant-participant evaluation value information. The intra-scene participant-participant evaluation value information includes a scene evaluation value (the time weight value, the number-of-participant weight value, the scene weight value, and the scene weight coefficient calculated for each scene based on the similar scene information) and a participant evaluation value (the participant weight coefficient calculated for each participant of each scene), in addition to the participant.-participant shared scene information.

The scene evaluation value of each participant-participant pair of each scene can be obtained by calculating the total value of the time weight value, the number-of-participant weight value, the scene weight value, and the scene weight coefficient of the scene, and the participant weight coefficient.

Note that when calculating the scene evaluation value, the total value may be calculated after weighing the time weight value, the number-of-participant weight value, and the scene weight value. Details will be described in "4.5. Intra-scene Participant-Participant Evaluation Value Calculation Processing" later. Here, for the sake of simplification, the explanation is continued under the assumption that the total value is calculated without weighing the above-mentioned weight values.

Here, let $R_{A-BS}$ be the evaluation value of the pair of the participant A and a participant B in a scene S. Then, an evaluation value $R_{A-B}$ of the pair of the participant A and the participant B in all the scenes is obtained by summating an evaluation value $R_{A-Bn}$ of each shared scene, as expressed by (Equation 6) below.

$$R_{A-B} = \Sigma R_{A-Bn} \quad \text{(Equation 6)}$$

In other words, by summating evaluation values of the same pair of two participants in all of the scenes, evaluation values 2.41, 2.9, 2.85, 0, 0, and 2.85 are eventually obtained for the pairs of the participants A and B, A and C, A and D, B and C, B and D, and C and D, respectively.

2.2.7. Evaluation Value Information Storage Unit 370

The evaluation value information storage unit 370 stores evaluation value information input from the intra-scene evaluation value calculation units 352 and 362. FIG. 21 shows the stored evaluation value information. As shown in FIG. 21, the evaluation value information storage unit 370 stores the intra-scene photographer-participant evaluation value information and the intra-scene participant-participant evaluation value information in an integrated form.

3. User Interface (UI)

Described next is an example of a display method that can be realized by the evaluation value calculation method described in the present embodiment.

Figure 22:
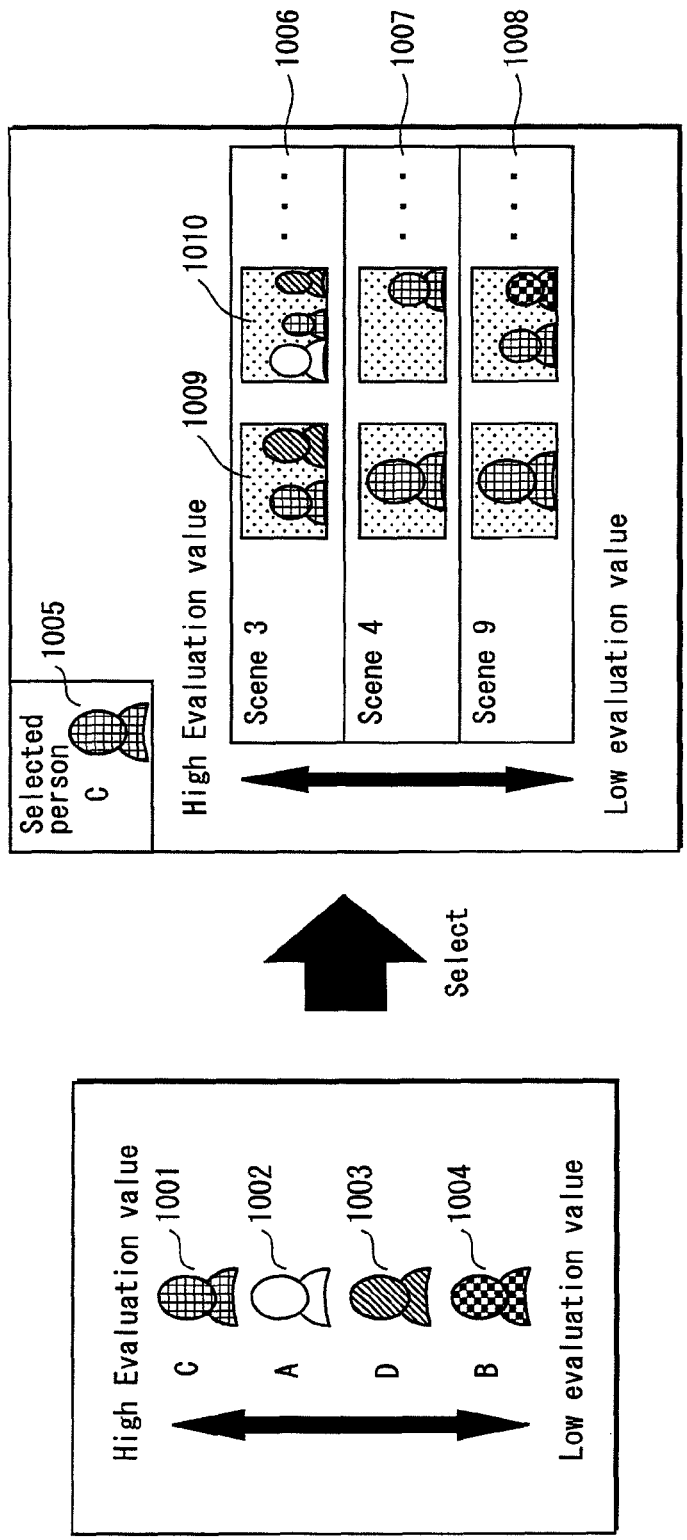
FIG. 22 shows an example of a display method.

FIG. 22 shows a display in which icons 1001-1004 each representing a participant are arranged in descending order of the evaluation value, from the highest to the lowest. The person C (the icon 1001) with the highest evaluation value is displayed at the top. As the icons, face images of the participants may be used, or full names of the participants may be displayed in letter. Use of the display method shown in FIG. 22 allows the photographer to easily determine which person has a high evaluation value and to estimate a relational closeness with each person.

When one of the icons 1001-1004 representing the people is selected by the user in the screen shown in the left portion of FIG. 22, the screen in the right portion of FIG. 22 is displayed. The screen in the right portion of FIG. 22 shows an exemplary case where the person C is selected. The icon 1001 indicating the selected person is displayed in a selected person display area 1005, and scenes in which the selected person participated are arranged in descending order of the evaluation value, from the highest to the lowest (1006-1008). Here, a scene 3 (1006) having the highest evaluation value is displayed at the top. In each area corresponding to a scene, some of the pieces of image data included in the scene are displayed as thumbnail images (1009 and 1010). It is preferable that pieces of image data that include the selected person C therein be selected as the thumbnail images. By using the display method shown in FIG. 22, the photographer is able to easily determine in which scenes he/she acted most closely with the selected person.

Upon a selection of any one of the scenes 1006-1008 in the screen indicated in the right portion of FIG. 22, pieces of moving image data included in the scene are displayed sequentially from the piece captured at the earliest time.

Figure 23:
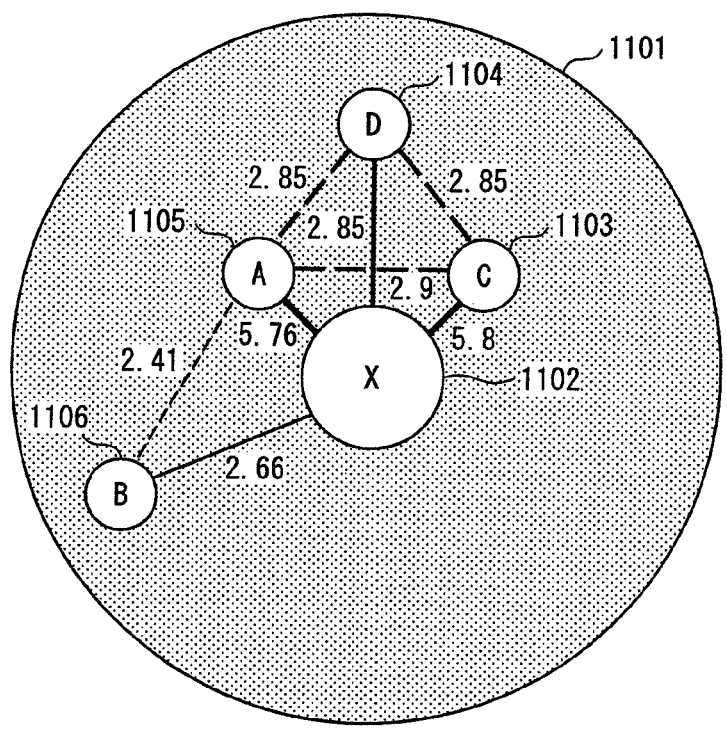
FIG. 23 shows an example of a display method.

Next, FIG. 23 show icons representing a photographer X (1102) and the participants A, B, C, and D (1103-1106) arranged in a display area 1101 based on evaluation values for the combinations of two of these people. The higher the evaluation value is, the closer the distance between the icons is. On the other hand, those combinations with a low evaluation value or with no evaluation value, i.e., without any shared scene, are displayed with a longer distance in between. Use of the display method shown in FIG. 23 facilitates visual recognition of pairs with a high evaluation value among pairs of the photographer and each participant.

It should be noted that upon a selection of one of the icons 1102-1106 representing people in FIG. 23, a screen showing scenes in which the selected person participated may be displayed, as shown in the right portion of FIG. 22.

4. Operations of Video Analysis Apparatus 2

4.1. Main Routine

Figure 24:
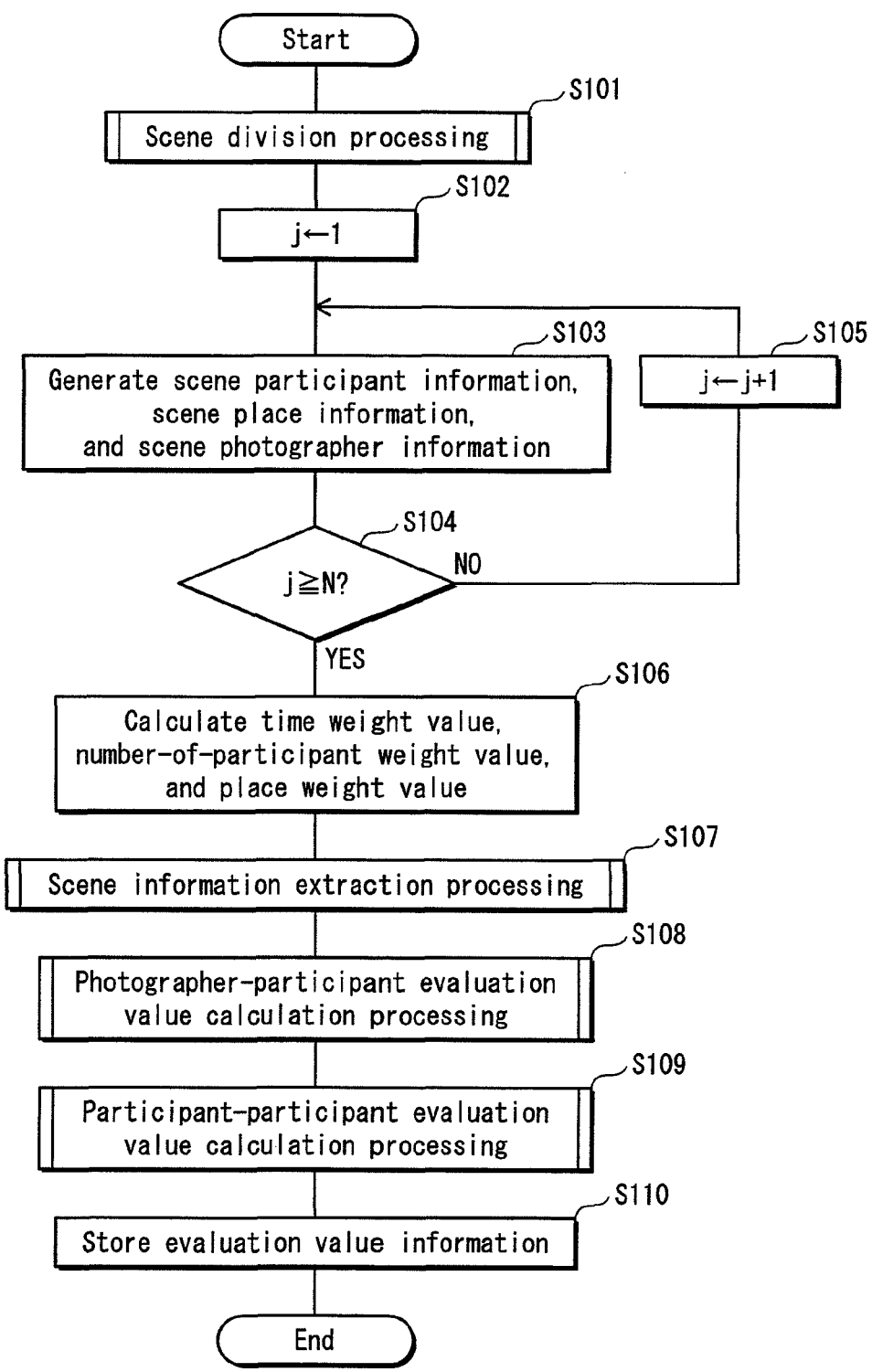
FIG. 24 is a flowchart showing overall operations of the video analysis apparatus 2

Next, operations of the video analysis apparatus 2 pertaining to the present invention are described. FIG. 24 is a flowchart showing overall operations of the video analysis apparatus 2. In the present flowchart, j is a variable for specifying a scene in moving image data targeted for analysis, and N indicates the total number of scenes in the moving image data.

First, the scene time information generation unit 321 performs scene division processing (described later) on moving image data stored in the moving image data storage unit 311, thereby dividing the moving image data into multiple scenes (step S101).

After the scene division processing, the value of the variable j for specifying the sequential position of a scene is initialized to 1 (step S102), and a scene participant information piece, a scene place information piece, and a scene photographer information piece are generated for the $j^{th}$ scene (step S103).

It is judged whether the value of the variable j has reached the total number of scenes N or not (step S104). If it is judged negatively (No at the step S104), the variable j is incremented by 1 (step S105), and the process goes to step 5103.

If it is judged affirmatively (Yes at the step S104), a time weight value, a number-of-participant weight value, and a place weight value are calculated (step S106), and scene information extraction processing (described later) is performed (step S107).

After the scene information extraction processing, intra-scene photographer-participant evaluation value calculation processing and intra-scene participant-participant evaluation value calculation processing (both to be described later) are performed (steps S108 and S109), and evaluation value information pieces calculated by these processing is stored into the evaluation value information storage unit 370 (step S110).

4.2. Scene Division Processing

Figure 25:
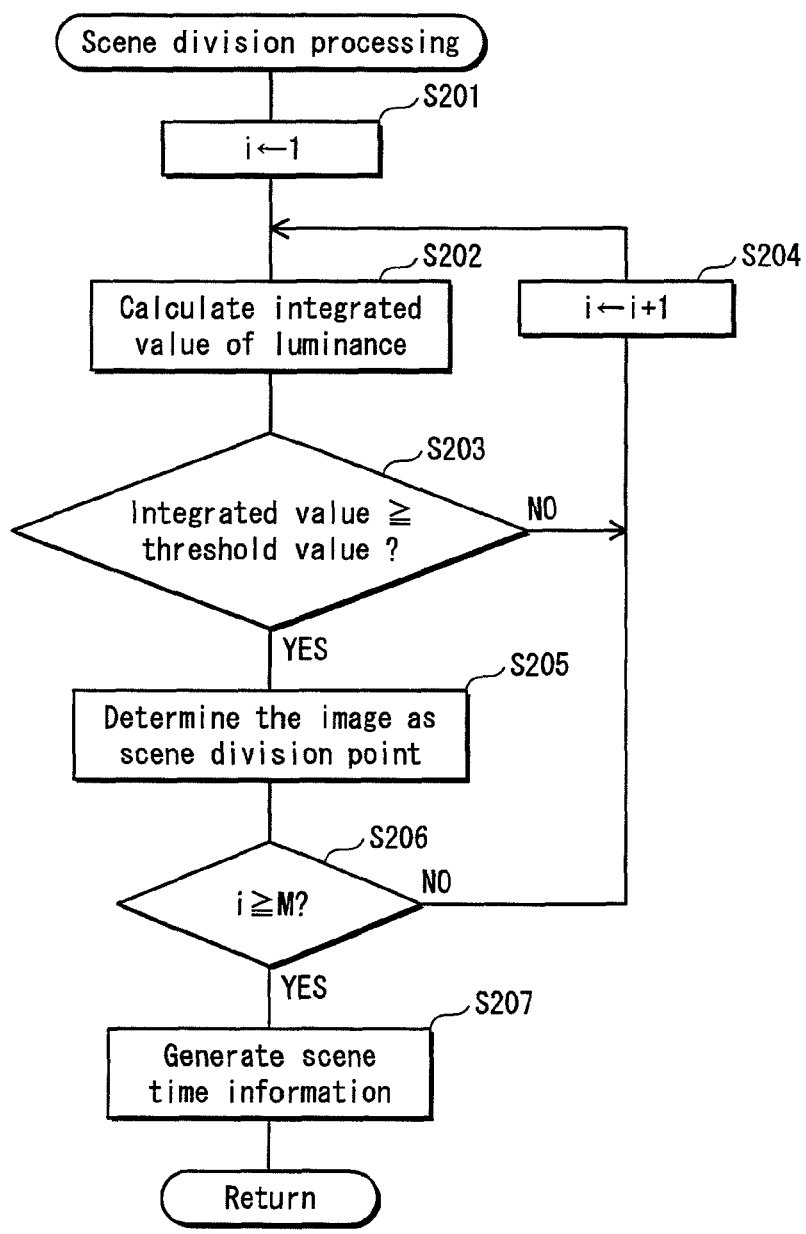
FIG. 25 is a flowchart showing scene division processing.

Next, the scene division processing is described. FIG. 25 is a flowchart showing the scene division processing. In the present flowchart, i is a variable for specifying a frame image in the moving data targeted for analysis, and M indicates the total number of frame images in the moving image data.

First, the scene time information generation unit 321 initializes the value of the variable i for specifying the sequential position of a frame image, to 1 (step S201), and calculates an integrated value of the luminance of pixels in the $i^{th}$ frame image (step S202).

It is judged whether or not the calculated integrated value is equal to or greater than a predetermined threshold value (step S203). If the integrated value is judged to be smaller than the threshold value (No at the step S203), is incremented by 1 (step S204), and the process goes to step S202.

If the integrated value is equal to or greater than the threshold value (Yes at the step S203), the $i^{th}$ frame image is determined as a division point for a scene (step S205).

It is judged whether the value of i has reached the total number of frame images M or not (step S206). If it is judged negatively (No at the step S206), i is incremented by 1 (step S204), and the process goes to the step S202.

If it is judged affirmatively (Yes at the step S206), scene time information is generated based on the frame image judged to be the division point (step S207).

4.3. Scene Information Extraction Processing

Figure 26:
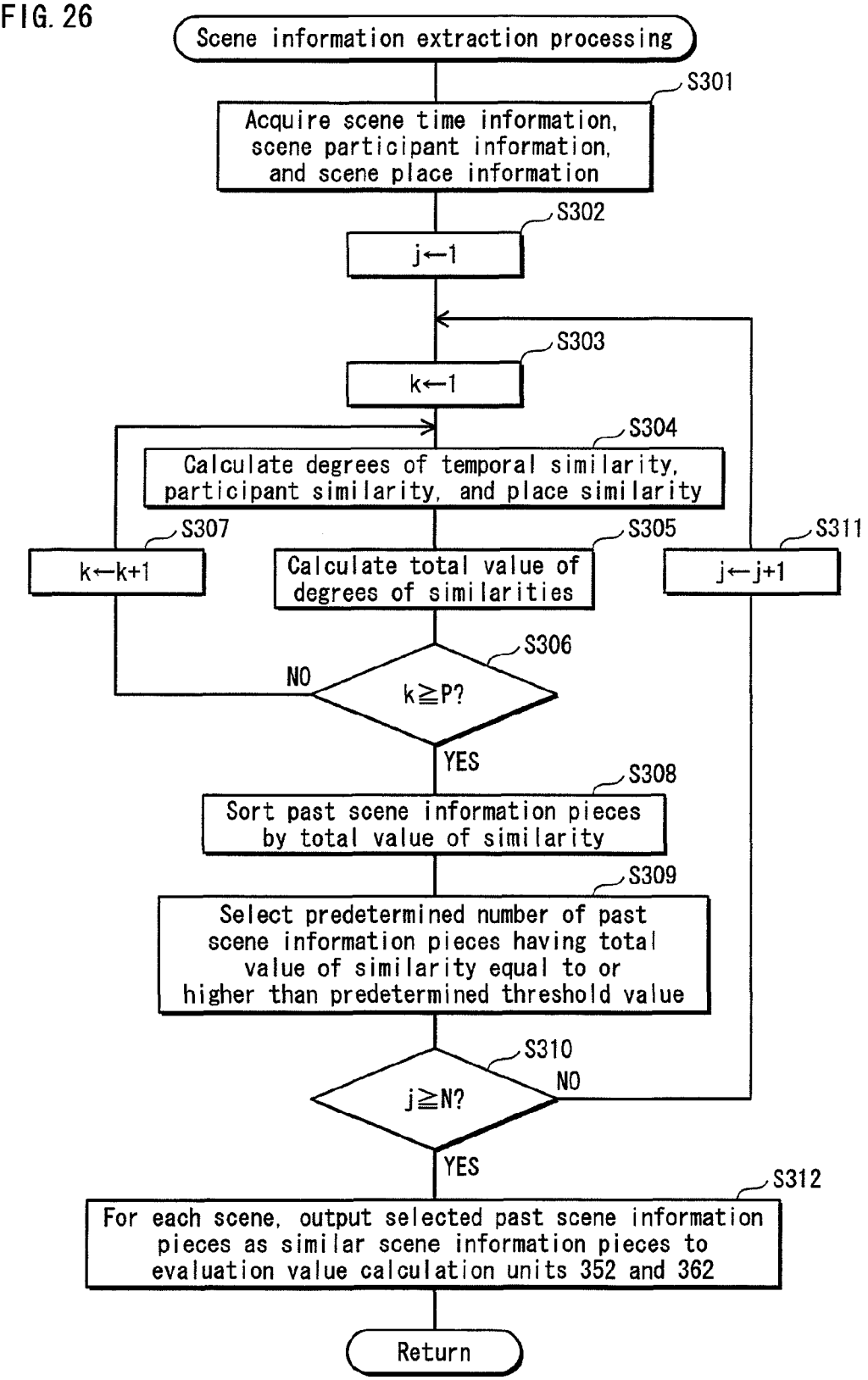
FIG. 26 is a flowchart showing scene information extraction processing.

Next, the scene information extraction processing is described. FIG. 26 is a flowchart showing the scene information extraction processing. In the present flowchart, j is a variable for specifying a scene information piece in the moving image data targeted for analysis, k is a variable indicating a past scene information piece accumulated in the scene information accumulation unit 342, and N indicates the total number of scene information pieces of the moving image data targeted for analysis, and P indicates the total number of past scene information pieces.

First, the similar scene information extraction unit 340 acquires the scene time information pieces, the scene participant information pieces, and the scene place information pieces (step S301) from the recorded information analysis unit 320.

The value of the variable j for specifying the sequential position of a scene information piece in the moving image data and the value of the variable k for specifying the sequential position of a past scene information piece are initialized to 1, respectively (steps S302 and S303), and the degrees of similarity between the $k^{th}$ past scene information piece and the $j^{th}$ scene information piece are calculated (step S304). The total value of the calculated degrees of similarity is obtained (step S305), and it is judged whether the value of k has reached the total number of past scene information pieces P or not (step S306).

If it is judged negatively (No at the step S306), k is incremented by 1 (step S307), and the process goes to step S304.

If it is judged affirmatively (Yes at the step S306), the past scene information pieces are sorted by the total value of the degrees of similarity (step S308), and a predetermined number of past scene information pieces with the total value of the degrees of similarity thereof being equal to or higher than a predetermined threshold are selected in descending order, based on the sorting result (step S309).

It is judged whether the value of j has reached the total number of scene information pieces N or not (step S310), and if it is judged negatively (No at the step S310), j is incremented by 1 (step S311), and the process goes to the step S303.

If it is judged affirmatively (Yes at the step S310), past scene information pieces selected for each scene is output to the intra-scene evaluation value calculation units 352 and 362 as similar scene information pieces(step S312).

Figure 27:
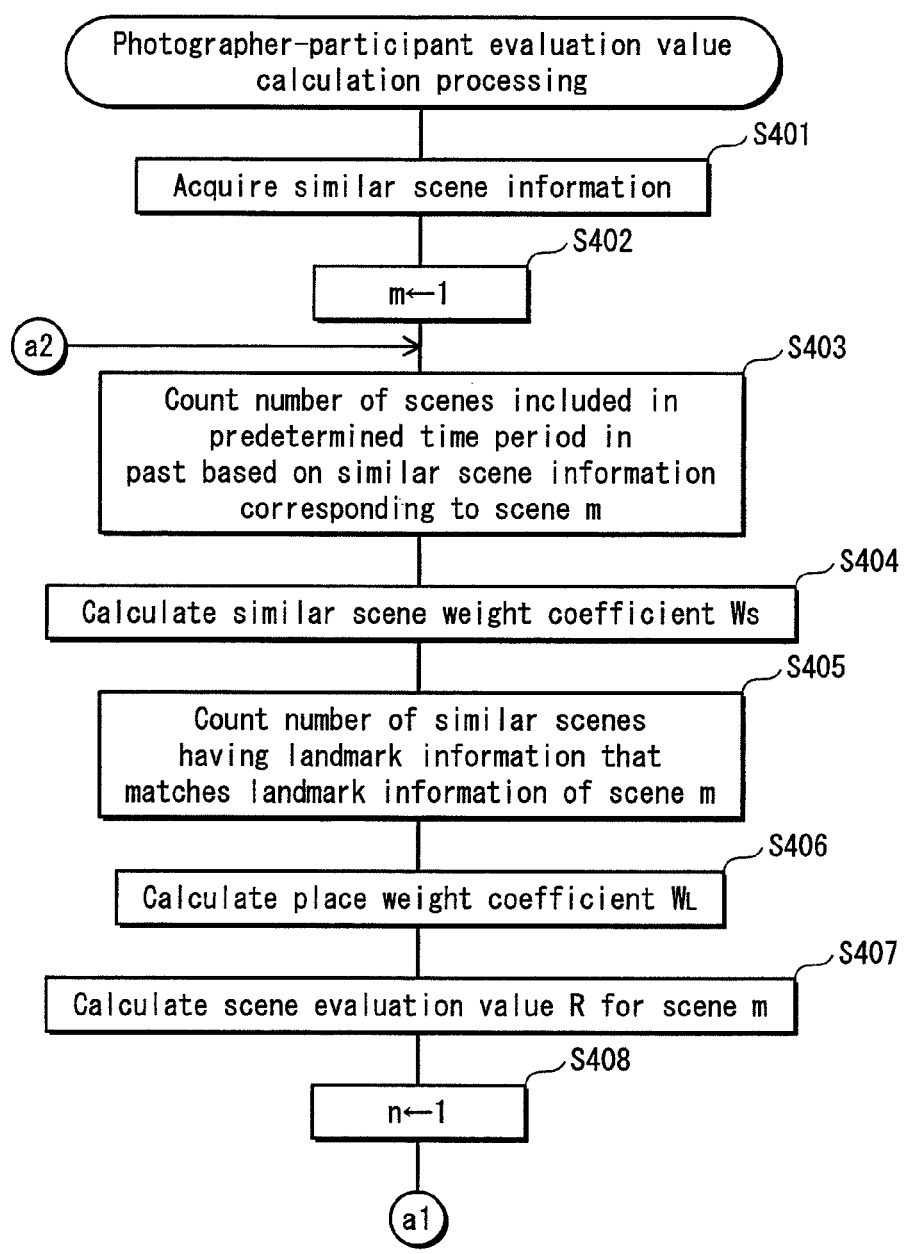
FIG. 27 is a flowchart showing intra-scene photographer-participant evaluation value calculation processing.
Figure 28:
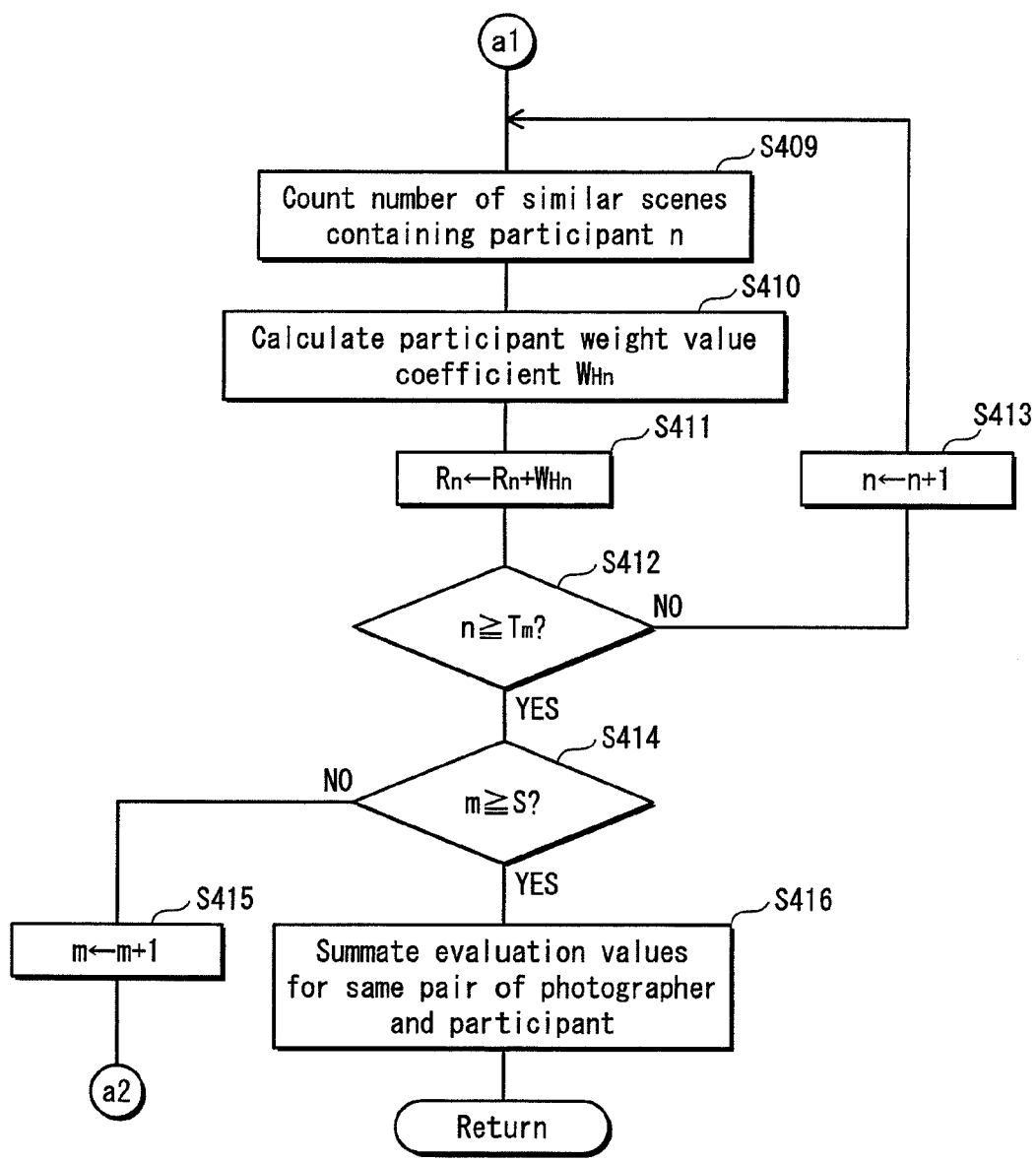
FIG. 28 is a flowchart showing the intra-scene photographer-participant evaluation value calculation processing.

4.4. Intra-scene Photographer-Participant Evaluation Value Calculation Processing Next, the processing for calculating the evaluation value R for a photographer-participant combination performed by the intra-scene photographer-participant evaluation value calculation unit 350 is described using FIGS. 27 and 28. FIGS. 27 and 28 show a flowchart of the intra-scene photographer-participant evaluation value calculation processing. In the present flowchart, m is a variable indicating a scene for which an evaluation value may be calculated; n is a variable for specifying a participant in a scene m; S indicates the total number of scenes for which the evaluation value maybe calculated; and $T_m$ indicates the total number of participants in the scene m.

First, the intra-scene evaluation value calculation unit 352 acquires, from the similar scene information extraction unit 340, similar scene information pieces extracted for each scene (step S401), and the value of the variable m is initialized to 1 (step S402). Among the similar scenes, the number of similar scenes which are included in a predetermined period of time in the past is counted, based on the similar scene information piece corresponding to the $m^{th}$ scene (step S403), and a scene weight coefficient $W_s$ is calculated according to the counted number (step S404). For example, an adjustment is made such that in a case where the photographer-participant pair frequently shared a similar scene in the past one year, the scene has a higher evaluation value.

The number of the similar scenes matching the landmark information of the $m^{th}$ scene is counted, based on the similar scene information pieces (step S405), and a place weight coefficient $W_L$, is calculated according to the counted number (step S406). For example, an adjustment is made such that in a case where there are a significant number of similar scenes that were captured at the same place in the past, the scene captured at the place has a higher evaluation value.

The intra- scene evaluation value calculation unit 352 acquires a time weight value $R_T$, a number-of-participant weight value $R_N$, and a place weight value $R_L$, of each scene from the scene weight value calculation unit 330, normalizes each weight value, multiplies each weight value by the corresponding weight coefficient, summates the weight values, and adds a scene weight value coefficient $W_s$ to the sum of the weight values, thereby obtaining a scene evaluation value R of the scene m (step S407). Here, for the scene weight coefficient $W_s$ and the place weight coefficient $W_s$, those values calculated in the steps S404 and S406, respectively, are used. The time weight coefficient $W_T$ or the number-of-participant coefficient $W_N$ is used when it is desired that the evaluation value be calculated with a focus on either of these coefficients.

(Equation 4) below is a computational expression for calculating the scene evaluation value R in the step S407.

$$R = W_S + W_T R_T + W_N R_N + W_L R_L \quad \text{(Equation 4)}$$

Next, the value of the variable n is initialized to 1 (step S408), and the number of similar scenes including a participant n is counted based on the similar scene information piece (step S409). Subsequently, a participant weight coefficient $W_{Hn}$ is calculated according to the counted number (step S410), and the calculated participant weight coefficient $W_{Hn}$ is added to the scene evaluation value $R_n$, thereby obtaining the scene evaluation value $R_n$ for each participant n (step S411). For example, an adjustment is made such that the more frequently the participant appears in the similar scenes in the past, the higher his/her evaluation value is.

It is judged whether the value of n has reached the total number of the participants $T_m$ in the scene m or not (step S412). If it is judged negatively (No at the step S412), n is incremented by 1 (step S413) and the process goes to the step S409.

If it is judged affirmatively (Yes at the step S412), it is judged whether the value of m has reached S or not (step S414). If it is judged negatively (No at the step S414), m is incremented by 1 (step S415) and the process goes to step S403. If it is judged affirmatively (Yes at the step S414), for each pair of the photographer and a participant, the evaluation values pertaining to the pair are summated, (step S416).

Figure 29:
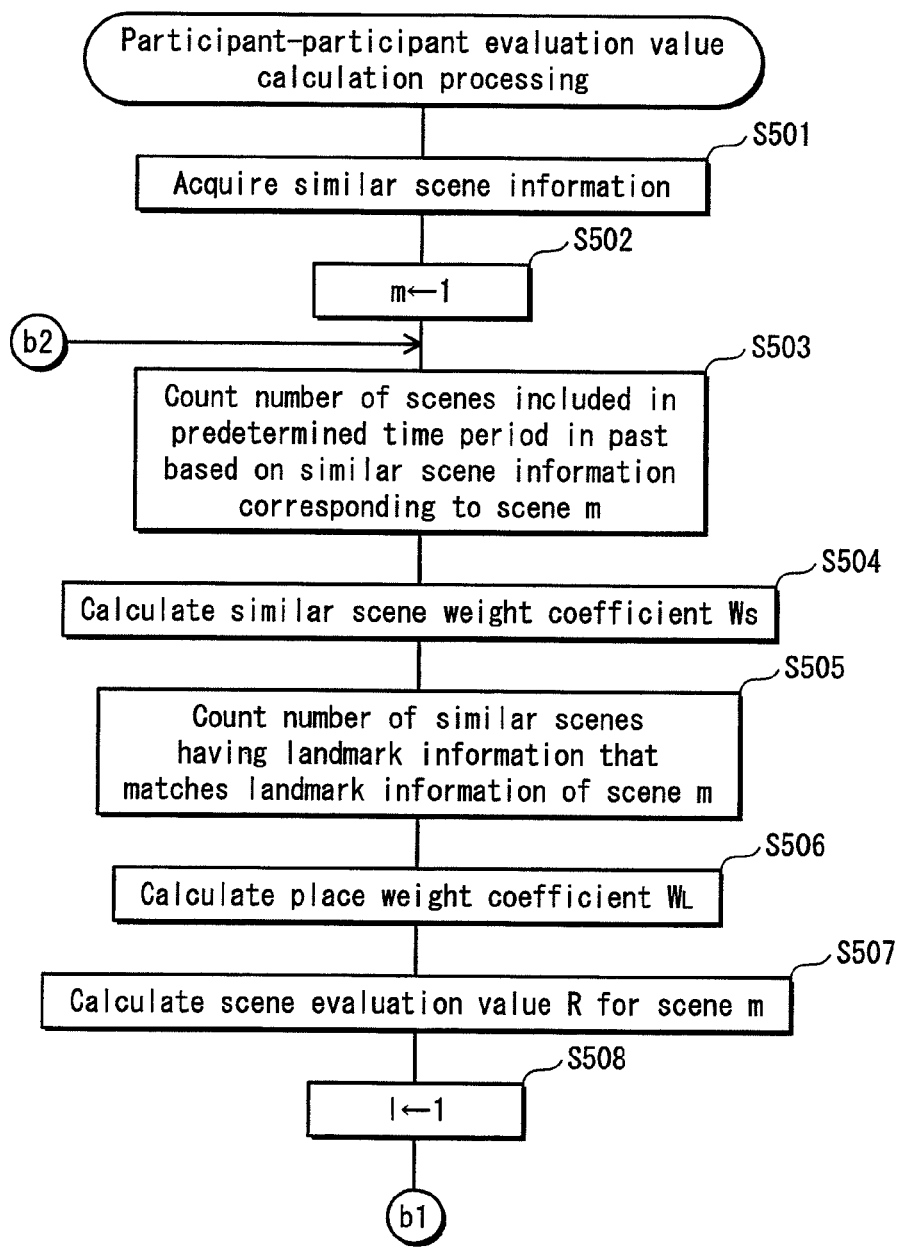
FIG. 29 is a flowchart showing intra-scene participant-participant evaluation value calculation processing.
Figure 30:
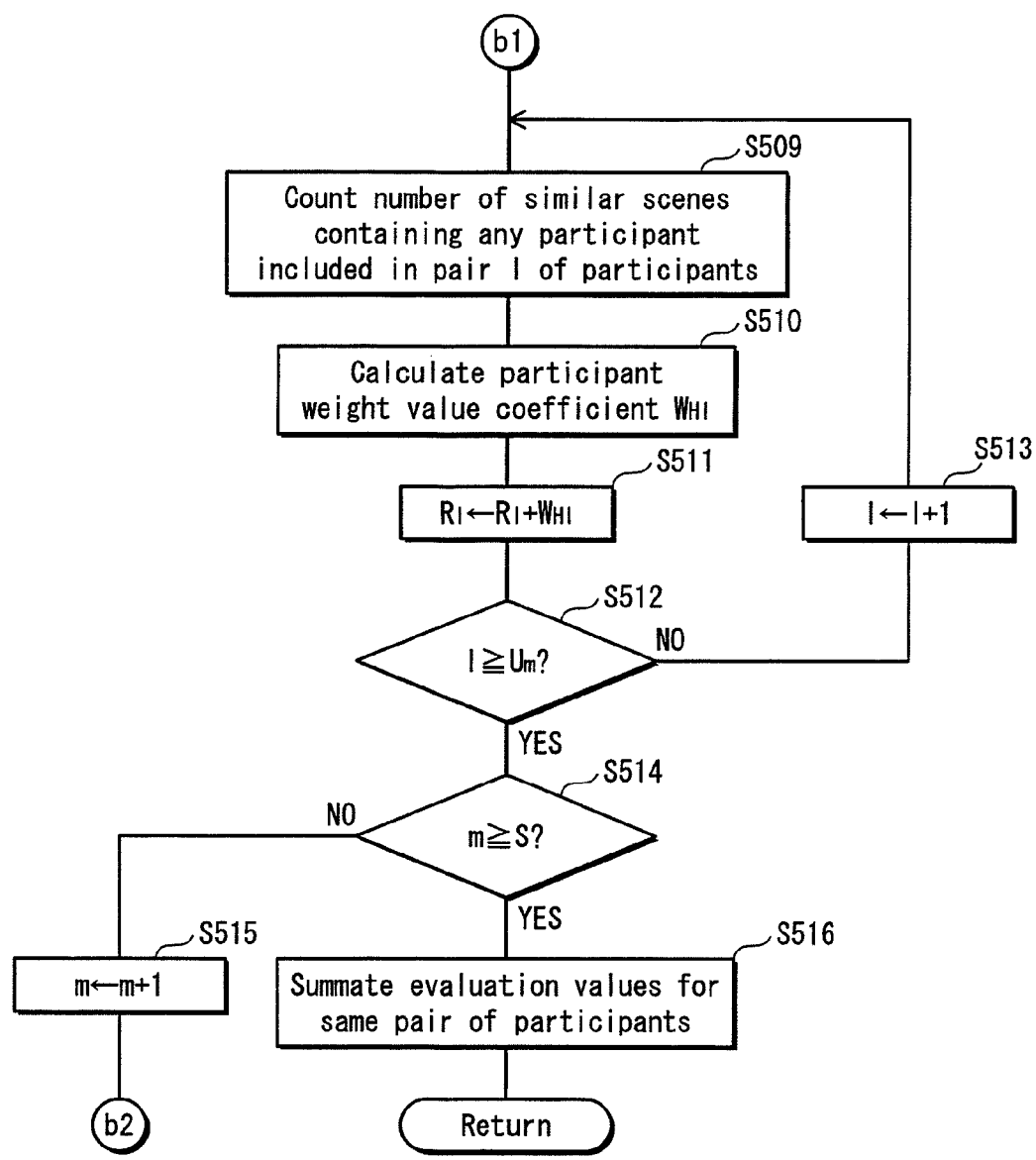
FIG. 30 is a flowchart showing the intra-scene participant-participant evaluation value calculation processing.

4.5. Intra-scene Participant-Participant Evaluation Value Calculation Processing Next, operations for calculating the evaluation value R for participant-participant combinations performed by the intra-scene participant -participant evaluation value calculation unit 360 is described using FIGS. 29 and 30. FIGS. 29 and 30 show a flowchart of the intra-scene participant-participant evaluation value calculation processing. In the present flowchart, m is a variable indicating a scene for which an evaluation value may be calculated; l is a variable for specifying a pair of participants in a scene m; S indicates the total number of scenes for which an evaluation value may be calculated; and $U_m$ indicates the total number of pairs of participants in the scene m. Because steps S501 to S507 are the same as the steps S401 to S407 of the intra-scene photographer-participant evaluation value calculation unit 350, description thereof is omitted here.

In the step 5507, after the scene evaluation value R is calculated, the value of the variable l is initialized to 1 (step 5508), and the number of similar scenes containing the pair of participants indicated by the variable l is counted, based on the similar scene information pieces (step S509).

A participant weight coefficient $W_{H1}$ is calculated according to the counted number (step S510), and the calculated participant weight coefficient $W_{H1}$ is added to a scene evaluation value $R_1$, whereby the evaluation value $R_1$ is obtained for the pair of participants indicated by the variable l (step S511). For example, an adjustment is made such that the more frequently a pair of participants appear together in similar scenes in the past, the higher the evaluation value for the pair is.

It is judged whether the value of l has reached the total number of pairs of participants $U_m$ in the scene m (step S512). If it is judged negatively (No at step S512), l is incremented by 1 (step S513), and the process goes to the step S509.

If it is judged affirmatively (Yes at the step S512), it is judged whether the value of m has reached S or not (step S514). If it is judged negatively (No at the step S514), m is incremented by 1 (step S515), and the process goes to step S503. If it is judged affirmatively (Yes at the step S514), the evaluation values for the same pair of participants are summated for each pair (step S516).

As described above, according to the present embodiment, an evaluation value with respect to a participant identified in a unit of a scene obtained by dividing image data in the time axis direction, that is, an evaluation value for the photographer of the moving image data and the participant, and an evaluation value for the participant and each of other participants can be calculated. By classifying and organizing the moving image data using the calculated evaluation values, interpersonal relationships among people related to the moving image data can be expressed appropriately.

Also, by weighing each scene based on the time length, number of participants, and position information of the scene as well as weighing each participant in the scene when calculating evaluation values, reliability of the calculated evaluation values can be improved.

[Second Embodiment]

In the first embodiment, moving image data captured by the data recording apparatus 1 is analyzed. However, in the present embodiment, multiple pieces of still image data (hereinafter, also referred to as "frame images") are analyzed. Accordingly, the data recording apparatus 1 in the present embodiment is, for example, a digital still camera (DSC) or the like.

5. Structure of Video Analysis Apparatus 2a

Figure 31:
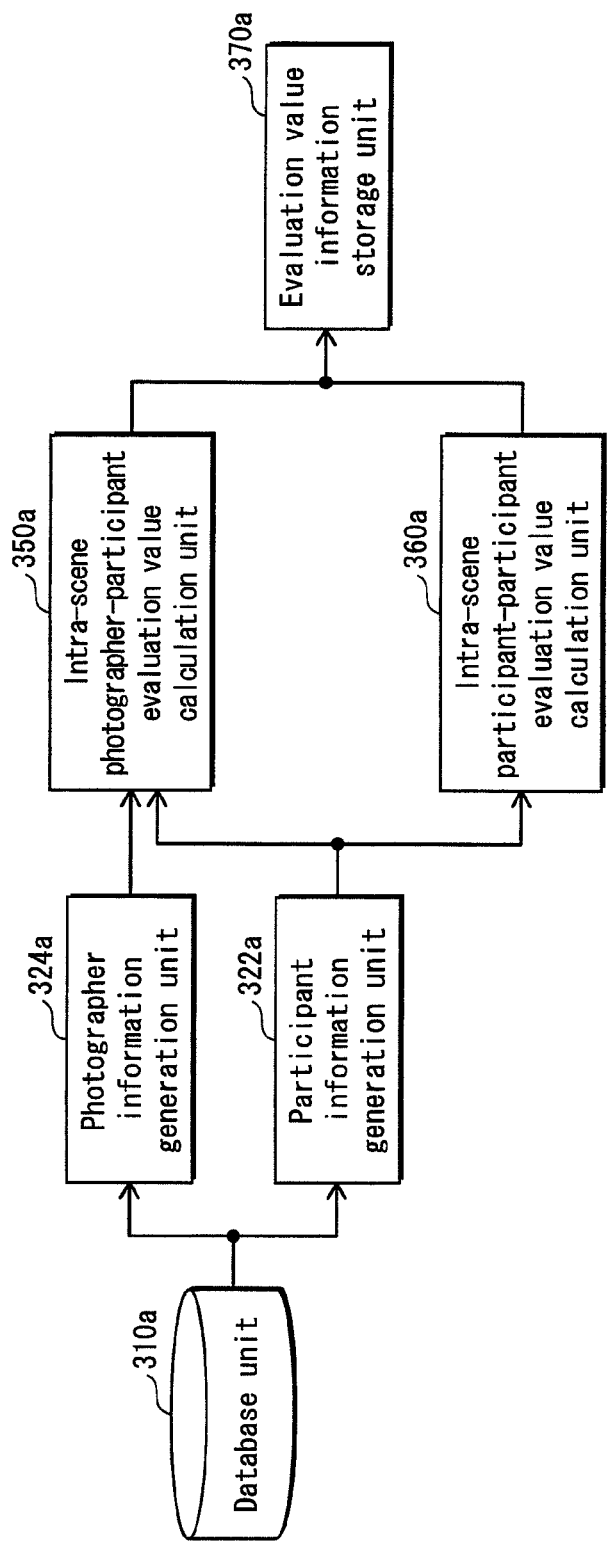

FIG. 31 is a block diagram showing a functional structure of a video analysis apparatus 2a in the present embodiment.

The video analysis apparatus unit 2a includes a database unit 310a, a participant information generation unit 322a, a photographer information generation unit 324a, a photographer-participant evaluation value calculation unit 350a, a participant-participant evaluation value calculation unit 360a, and an evaluation value information storage unit 370a.

The database unit 310a stores multiple pieces of still image data captured by a digital still camera (DSC) in correspondence with position information indicating positions where the pieces of still image data were captured.

The photographer information generation unit 324a reads multiple pieces of still image data from the database unit 310a and, for each piece of still image data, generates a photographer information piece indicating information on the person who captured the piece of still image data, and outputs the generated photographer information piece to the photographer-participant evaluation value calculation unit 350a. Specifically, a short-distance wireless tag is provided to multiple people who may become the photographer and to image-capturing devices in advance, and a person who is nearest to the image-capturing device during image-capturing and who is not captured in captured images is detected as the photographer.

FIG. 32 shows photographer information. As shown in FIG. 32, each photographer information piece associates, for one of the multiple images, an image identifier (ID) for identifying the image and a photographer ID indicating the person judged to be the photographer of the image.

The participant information generation unit 322a reads multiple pieces of still image data from the database unit 310a, and for each of the still image data, generates a participant information piece indicating information on one or more people image-captured in the piece of still image data. The participant information generation unit 322a outputs the generated participant information piece to the photographer-participant evaluation value calculation unit 350a and the participant-participant evaluation value calculation unit 360a.

FIG. 33 shows participant information. As shown in FIG. 33, each participant information piece associates, for one of the multiple images, the image identifier (ID) and a participant ID indicating the person judged to be a participant of the image. When there is no participant other than the photographer, the participant ID is not appended.

The photographer-participant evaluation value calculation unit 350a calculates, for each combination of the photographer and a participant in each image, an evaluation value based on the photographer information pieces input from the photographer information generation unit 324a and the participant information pieces input from the participant information generation unit 322a, and outputs the calculated evaluation values to the evaluation value information storage unit 370a. Specifically, each evaluation value is calculated according to the number of images that contain both the photographer and the participant.

The participant-participant evaluation value calculation unit 360a calculates, an evaluation value for each combination of participants in each image, based on the participant information pieces input from the participant information generation unit 322a, and outputs the calculated evaluation values to the evaluation value information storage unit 370a. Specifically, each evaluation value is calculated according to the number of images that contain the combination of the participants.

The evaluation value information storage unit 370a stores the evaluation values received from the photographer-participant evaluation value calculation unit 350a and the evaluation values received from the participant-participant evaluation value calculation unit 360a in correspondence with each other. FIG. 34 shows evaluation value information. For example, the evaluation value for the combination of the person X and the person A is calculated as follows: the evaluation value is increased by 1 based on the image ID 2 for which the person X is the photographer and the person A is a participant; the evaluation value is increased by 2 based on the images ID 3 and 4 for which the person A is the photographer and the person X is a participant; as a whole, the evaluation value for the combination of the person A and the person X is 3.

6. Operations of the Video Analysis Apparatus 2a

Figure 35:
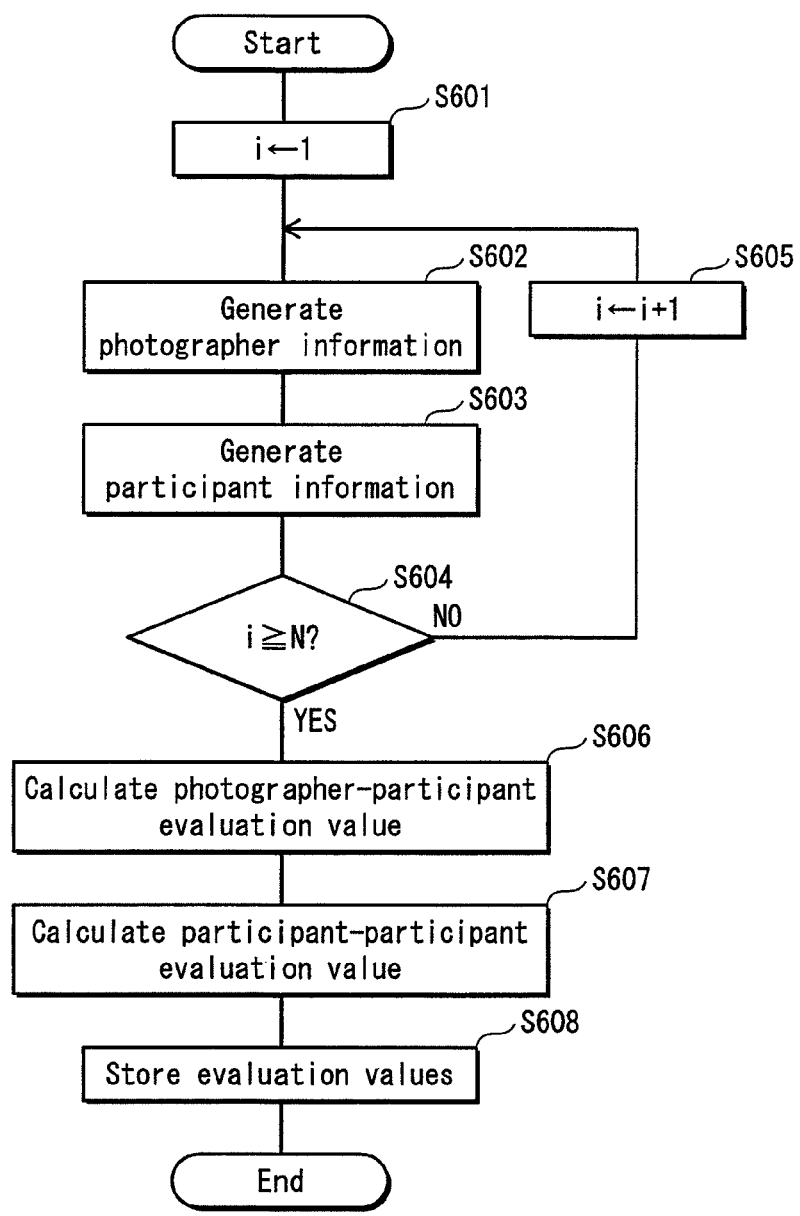

Next, operations of the video analysis apparatus unit 2a are described. FIG. 35 is a flowchart showing the operations of the video analysis apparatus unit 2a. In the present flowchart, i is a variable for specifying a frame image among multiple frame images, and N indicates the total number of the frame images.

First, the value of the variable i for specifying the sequential position of a frame image in the frame images is initialized to 1 (step S601), and a photographer information piece and a participant information piece are generated for the $i^{th}$ frame image (steps S602 and S603).

It is judged whether the value of the variable i has reached the total number of frame images N or not (step S604).

If it is judged negatively (No at the step S604), the variable i is incremented by 1 (step S605), and the process goes to step S602).

If it is judged affirmatively (Yes at the step S604), the photographer-participant evaluation value is calculated (step S606), and the participant-participant evaluation value is calculated (step S607). Subsequently, the calculated evaluation values are stored in the evaluation value information storage unit 370a (step S608).

As described above, even in a case where multiple photographers (X and A) capture still image data, the evaluation value for each combination of a photographer and a participant can be calculated based on the photographer information pieces and the participant information pieces.

[Modifications]

While the present invention has been described through the above-described embodiments, it is not limited to the embodiments, and, for example, includes the following modifications as well.

(1) According to the first embodiment above, moving image data is divided into scenes based on image information. However, scene division points can be determined as follows instead: one of or all of the image information, audio information and sensor information are analyzed; time points where the characteristic amount thereof changes are determined to be the scene division points.

For example, moving image data may be divided as follows: in a case where moving image data is divided into scenes based on the audio information, the moving image data may be divided when the surrounding audio condition has changed significantly; in a case where moving image data is divided into scenes based on the sensor information, the moving image is divided when the image-capturing place has changed significantly based on the sensor information such as position information acquired by a GPS sensor.

The scene division method does not need to be automatic. Instead, the moving image data can be divided into scenes according to a predetermined time length or by manual operations by the user.

(2) In the embodiments above, a face image recognition technique is used as a method for identifying participants. However, other methods may be used. For example, the following method can be used: an audio information piece is compared with pre-registered audio information pieces of the people, using a speaker recognition technique; when a person whose pre-registered audio information piece matches the audio information piece is image-captured in the scene, he/she is determined to be a participant of the scene.

In a case where the data recording apparatus 1 is equipped with a position information acquisition sensor such as a GPS, a participant who was within a predetermined distance from the photographer in terms of a difference of position information may be determined as a participant.

Furthermore, in a case where the data recording apparatus 1 and people in a vicinity thereof are provided with a sensor such as a short-distance wireless tag, a person who was within such a distance range that he/she was able to perform wireless communication for a predetermined period of time in the scene may be determined as a participant.

It should be noted that a method for determining participants does not need to be automatic; the user can input participants manually instead.

(3) In the embodiments above, whether someone is a participant or not is determined by whether that person is image-captured in no less than a predetermined number of frame images constituting the scene. However, someone may be determined to be a participant when that person is captured in no less than a predetermined ration of frame image of the scene.

(4) In the embodiments above, place information is detected based on GPS. However, a method using information other than GPS information may be used to detect the place information. For example, radio wave information may be acquired from a stationary base station of a mobile telephone, a public wireless LAN or the like, and position information of the stationary base station may be provided as the place information of the scene.

It should be noted that a method for detecting place information does need to be automatic, and latitude, longitude, and landmark information can be provided manually by the user.

(5) According to the structure of the first embodiment above, a scene photographer information piece is pre-stored by a user input. However, in a case where no photographer information is stored, the following processing may be performed: an audio information piece is detected from the scene; the detected audio information piece is compared with pre-stored audio information pieces of people in the audio/face information storage unit 312 to judge whether there is any match, using a speaker recognition technique; at the same time, a face image is detected for each person in each frame image constituting the scene, and it is judged with use of a face image recognition technique whether each detected face image matches any of the face images stored in the audio/face information storage unit 312.

When the results of the judgements indicate that the detected audio information piece matches any stored audio information piece and the person whose voice matches the detected audio information piece is not captured in the scene at all, the person is judged to be the photographer of the scene.

Alternatively, a method other than a speaker recognition technique can be used as a method for judging the photographer information. For example, in a case where multiple persons who may be a photographer and image-capturing devices are each provided with a short-distance wireless tag, a person who was within a predetermined distance range from the capturing device of the scene for a period of time may be judged to be the photographer. Here, the distance range is a range that allows the person to capture the image using the capturing device.

(6) In the embodiments above, time weight values are calculated based on time lengths. However, time weight values may be calculated not using time lengths but based on time zones of the scenes. For example, scenes captured on holidays or at night times may be given more weight than those captured during weekday afternoons.

(7) In the embodiments above, place weight values are calculated based on a differential value of position information. However, place weight values can be calculated based not on a differential value but on types of places indicated by the landmark information of the scene. Specifically, the following processing may be performed: an evaluation value correspondence table and a place correspondence table are stored in advance; the evaluation value correspondence table associates a type of a place indicated by the landmark information and an evaluation value indicating a degree of relational closeness; the place correspondence table associates the place indicated by the landmark information and a type of the place; the type of the capturing place is specified based on the place indicated by the landmark information referring to the place correspondence table; furthermore, an evaluation value corresponding to the specified type of the capturing place is specified referring to the evaluation value correspondence table; and a scene evaluation value is calculated based on the specified evaluation value. Regarding the evaluation value correspondence table, for example, a greater weight may be given to leisure spots such as an amusement park.

(8) In the first embodiment above, the photographer is the same one person for all of the scenes. However, the photographer is not necessarily the same person for all of the scenes.

A person who was a participant at a scene may become the photographer of another scene. In this case, a user who performs image-capturing may input photographer information himself/herself in advance when performing image capturing using the data recording apparatus 1.

(9) In the embodiments above, an evaluation value is obtained by adding the time, number-of-participant, and place weight values. However, the evaluation value can be obtained not by adding these weight values but by multiplying these weight values.

Also, not all of these weight values need to be used. The evaluation value may be obtained by arbitrarily combining one or more of these weight values.

Additionally, the evaluation value can be calculated using preset weight coefficients, instead of using past similar scene information.

(10) In the embodiments above, degrees of similarity are calculated for all of the past scene information pieces accumulated in the scene information accumulation unit 342.

However, the degrees of similarity may be calculated for past scene information pieces captured within a predetermined time range instead.

(11) In the embodiments above, the scene weight coefficient $W_s$ is obtained by counting the number of similar scenes included in a predetermined time period. However, the scene weight coefficient $W_s$ may be obtained by detecting a chronological periodicity of similar scenes based on time information pieces of similar scene information pieces. That is, scenes that occur every day at the same time may be determined as everyday scenes and are assigned a low value for the scene weight coefficient $W_s$.

(12) In the embodiments above, the number-of-participant weight coefficient $W_N$ is set when it is desired that the evaluation value be calculated with a focus on the number-of-participant weight coefficient $W_N$. Specifically, the number-of-participant weight coefficient $W_N$ may be calculated in accordance with the number of accumulated scenes which include a captured person. In this case, the number-of-participant weight coefficient $W_N$ may be designed to be higher with an increase of the number of accumulated scenes which include the captured person.

Additionally, the scene weight coefficient $W_s$ and the place weight coefficient $W_L$ may be increased and decreased as necessary. For example, when it is desired to put more focus on the evaluation value for the place, the evaluation value is added after the place weight coefficient $W_L$ is increased.

(13) The evaluation values calculated by the intra-scene photographer-participant evaluation value calculation unit 350 and the evaluation values calculated by the intra-scene participant-participant evaluation value calculation unit 360 may be weighed differently.

(14) In the first embodiment above, video analysis is performed on moving image data recorded in a chronologically sequential manner. However, video analysis may be performed on multiple still images. In this case, as described above, the multiple still images may be divided into scenes based on image information of the still images, or may be divided into scenes based on time information, place information or the like. When dividing into scenes based on the time information, for example, still images captured during a predetermined time zone are assembled into the same scene. when dividing into scenes based on the place information, for example, still images having the same place information are assembled into the same scene.

By calculating an evaluation for each scene, the same effect as that in the case of moving image data can be achieved.

(15) The embodiments and modifications above may be combined.

Additionally, various changes and modifications are possible with respect to the video analysis apparatus pertaining to the present invention, and unless such changes and modifications depart from the scope of the present invention, they should be construed as being included therein.

[Industrial Applicability]

The present invention is especially useful for content viewer software that classifies and organizes personal contents captured with use of a wearable terminal, video camera, a DSC or the like, using, as indexes, evaluation values indicating interpersonal relationships.

The invention claimed is:

1. An image analysis apparatus comprising:
   a processor; and
   a memory device storing instructions executable by the processor,
   wherein, when executed by the processor, the instructions cause the processor to operate as a plurality of functional units including:
      an identification unit operable to define a plurality of scenes within image data, identify one or more persons who appear in each of the plurality of scenes, and determine scene information for each of the plurality of scenes, the scene information indicating, for each respective scene of the plurality of scenes, at least one of the following factors: one or more persons appearing in the scene; an image-captured time of the scene; and an image-captured place of the scene;
      a scene evaluation value calculation unit operable to calculate a first evaluation value for each of the plurality of scenes by using the scene information; and
      a person evaluation value calculation unit operable to calculate a second evaluation value for a specific person by using the first evaluation value for a scene, of the plurality of scenes, in which the identification unit has identified the specific person.

2. The image analysis apparatus of claim 1, wherein the person evaluation value calculation unit uses the first evaluation value for the scene in which the identification unit has identified the specific person, only when a specific photographer has image-captured the scene in which the identification unit has identified the specific person, such that a higher level of the second evaluation value for the specific person indicates a higher degree of intimacy between the specific person and the specific photographer.

3. The image analysis apparatus of claim 1, wherein the person evaluation value calculation unit uses the first evaluation value for the scene in which the identification unit has identified the specific person, only when the identification unit has further identified a different person in the scene in which the identification unit has identified the specific person, such that a higher level of the second evaluation value for the specific person indicates a higher degree of intimacy between the specific person and the different person.

4. The image analysis apparatus of claim 1, wherein
   each respective scene of the plurality of scenes includes a time information piece indicating an image-capturing time of the respective scene,
   the identification unit determines the time information piece for each of the plurality of scenes as the scene information, and
   the scene evaluation value calculation unit, when calculating the first evaluation value for a particular scene, of the plurality of scenes, uses the time information piece for the particular scene.

5. The image analysis apparatus of claim 4, wherein the scene evaluation value calculation unit, when calculating the first evaluation value for a specific scene, of the plurality of scenes, uses a time length of the specific scene obtained from the time information piece for the specific scene, such that the longer the time length of the specific scene, the higher the first evaluation value for the specific scene.

6. The image analysis apparatus of claim 4, wherein the scene evaluation value calculation unit, when calculating the first evaluation value for a specific scene, of the plurality of scenes, uses an image-capturing time period of the specific scene obtained from the time information piece for the specific scene.

7. The image analysis apparatus of claim 1, wherein the scene evaluation value calculation unit, when calculating the first evaluation value for a particular scene, of the plurality of scenes, uses a number of persons identified in the particular scene, such that the smaller the number of persons, the higher the first evaluation value.

8. The image analysis apparatus of claim 1, wherein
   each respective scene of the plurality of scenes includes a place information piece that indicates an image-capturing place of the respective scene,
   the identification unit determines the place information piece for each of the plurality of scenes as the scene information, and
   the scene evaluation value calculation unit, when calculating the first evaluation value for a particular scene, of the plurality of scenes, uses the place information piece for the particular scene.

9. The image analysis apparatus of claim 8 further comprising:
   a storage unit storing an evaluation value correspondence table that associates types of the image-capturing place with third evaluation values, and a place correspondence table that associates the place information piece and the types of the image-capturing place for each of the plurality of scenes; and
   a place specification unit operable to refer to the place correspondence table to specify one of the types of the image-capturing place corresponding to the place information piece of a scene of the plurality of scenes, wherein
   the identification unit uses the place specification unit to determine a type of the image-capturing place, of the types of the image-capturing place, for each of the plurality of scenes, and
   the scene evaluation value calculation unit refers to the evaluation value correspondence table to specify one of the third evaluation values corresponding to the type of the image-capturing place determined by the identification unit, and uses the specified one of the third evaluation values to calculate the first evaluation value.

10. The image analysis apparatus of claim 8 further comprising:
    a distance determination unit operable to determine a distance from a pre-stored reference place to the image-capturing place of each of the plurality of scenes indicated by the place information piece,
    wherein the scene evaluation value calculation unit, when calculating the first evaluation value for each of the plurality of scenes, uses the distance determined by the distance determination unit, such that the longer the distance, the higher the first evaluation value.

11. The image analysis apparatus of claim 1, wherein
    each respective scene of the plurality of scenes includes a time information piece that indicates an image-capturing time of the respective scene and a place information piece that indicates an image-capturing place of the respective scene, the identification unit determines, as the scene information for each respective scene of the plurality of scenes, at least one of the time information piece of the respective scene, the place information piece of the respective scene, and persons identified in the respective scene, and the scene evaluation value calculation unit, when calculating the first evaluation value for a particular scene, of the plurality of scenes, uses at least one of the time information piece for the particular scene, the place information piece for the particular scene, and a number of the persons identified in the particular scene.

12. The image analysis apparatus of claim 1, further comprising:

an accumulation unit accumulating scene information for scenes of the plurality of scenes that are defined in other image data, the accumulated scene information indicating, for each of the scenes, at least one of the following factors: an image-capturing time of the scene; one or more persons appearing in the scene; and an image-capturing place of the scene; and an extraction unit operable to extract a piece from the accumulated scene information, the extracted piece being equal or similar to a piece of the scene information determined by the identification unit, the piece of the determined scene information being related to a scene in which the identification unit has identified at least one person, wherein the scene evaluation value calculation unit, when calculating the first evaluation value for a particular scene, of the plurality of scenes, uses the piece that the extraction unit has extracted from the accumulated scene information as being equal or similar to the piece of determined scene information for the particular scene.

13. The image analysis apparatus of claim 12, wherein the scene information determined by the identification unit indicates one or more persons that the identification unit has identified in each of the plurality of scenes, the scene information accumulated in the accumulation unit indicates one or more persons that has been identified in each of the scenes, and the scene evaluation value calculation unit calculates the first evaluation value for a scene, of the plurality of scenes, for which a first piece of the scene information indicates a specific person, such that the first evaluation value is at a higher level when a larger number of second pieces extracted by the extraction unit from the accumulated scene information as being equal or similar to the first piece indicates the specific person.

14. The image analysis apparatus of claim 12, wherein the scene information determined by the identification unit indicates an image-capturing time of each of the plurality of scenes, the scene information accumulated in the accumulation unit indicates an image-capturing time of each of the scenes, and the scene evaluation value calculation unit calculates the first evaluation value for a scene, of the plurality of scenes, on which a first piece of the scene information indicates an image-capturing time that falls within a predetermined time period, such that the first evaluation value is at a higher level when a larger number of second pieces extracted by the extraction unit from the accumulated scene information as being equal or similar to the first piece indicates image-capturing times that fall within the predetermined time period.

15. The image analysis apparatus of claim 12, wherein the scene information determined by the identification unit indicates an image-capturing time of each of the plurality of scenes, the scene information accumulated by the accumulation unit indicates an image-capturing time of each of the scenes, and the scene evaluation value calculation unit calculates the first evaluation value for a scene, of the plurality of scenes, on which a first piece of the scene information indicates a specific image-capturing time, such that the first evaluation value is at a higher level when second pieces extracted by the extraction unit from the accumulated scene information as being equal or similar to the first piece indicates more noticeable regularity of the specific image-capturing time.

16. The image analysis apparatus of claim 2 further comprising:

a reception unit operable to receive capturer information that indicates a photographer of each scene, of the plurality of scenes, in which the specific person has been identified, wherein the person evaluation value calculation unit selects the specific photographer among photographers indicated by the capturer information.

17. The image analysis apparatus of claim 1, wherein each of the plurality of scenes indicates a temporally continuous portion of moving image data or pieces of still image data that were image-captured in a same time period.

18. An evaluation value calculation method for use by a processor and a memory device storing instructions executable by the processor, the evaluation value calculation method causing the processor to execute the instructions so as to perform steps comprising:

defining a plurality of scenes with image data;

identifying one or more persons who appear in each of the plurality of scenes;

determining scene information for each of the plurality of scenes, the scene information indicating, for each respective scene of the plurality of scenes, at least one of the following factors: one or more persons appearing in the scene; an image-captured time of the scene; and an image-captured place of the scene;

calculating a first evaluation value for each of the plurality of scenes by using the scene information; and calculating a second evaluation value for a specific person by using the first evaluation value for a scene, of the plurality of scenes, in which the specific person has been identified.

* * * * *